United States Patent
Usami et al.

(10) Patent No.: US 11,052,609 B2
(45) Date of Patent: Jul. 6, 2021

(54) MOLDING SYSTEM, DATA PROCESSING DEVICE FOR GENERATING MOLDING DATA, AND METHOD OF MANUFACTURING THREE-DIMENSIONAL OBJECT

(71) Applicant: CANON KABUSHIKI KAISHA, Tokyo (JP)

(72) Inventors: Hirokazu Usami, Yokohama (JP); Tatsuya Tada, Yokohama (JP); Kenji Karashima, Tokyo (JP); Genya Anan, Inagi (JP); Takashi Kase, Tokyo (JP); Satoru Yamanaka, Kawasaki (JP); Yuji Wakabayashi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/064,853

(22) PCT Filed: Dec. 16, 2016

(86) PCT No.: PCT/JP2016/005164
§ 371 (c)(1),
(2) Date: Jun. 21, 2018

(87) PCT Pub. No.: WO2017/110074
PCT Pub. Date: Jun. 29, 2017

(65) Prior Publication Data
US 2019/0001578 A1 Jan. 3, 2019

(30) Foreign Application Priority Data

Dec. 21, 2015 (JP) .................................. 2015-249088
Dec. 7, 2016 (JP) .................................. 2016-237685

(51) Int. Cl.
*B32B 41/00* (2006.01)
*B29C 64/393* (2017.01)
(Continued)

(52) U.S. Cl.
CPC .......... *B29C 64/393* (2017.08); *B29C 64/147* (2017.08); *B29C 64/205* (2017.08);
(Continued)

(58) Field of Classification Search
CPC ... B29C 64/393; B29C 64/205; B29C 64/147; B33Y 10/00; B33Y 30/00; G03G 15/224; G03G 15/225
(Continued)

(56) References Cited

U.S. PATENT DOCUMENTS 5,088,047 A 2/1992 Bynum
6,206,672 B1 3/2001 Grenda
(Continued)

FOREIGN PATENT DOCUMENTS

CN 101693407 A 4/2010
CN 101779283 A 7/2010
(Continued)

OTHER PUBLICATIONS

International Search Report and Written Opinion dated Dec. 16, 2016, issued in corresponding International Application No. PCT/JP2016/005164.
(Continued)

*Primary Examiner* — Michael N Orlando
*Assistant Examiner* — Joshel Rivera
(74) *Attorney, Agent, or Firm* — Venable LLP

(57) ABSTRACT

A molding system to manufacture a three-dimensional object corresponding to a three-dimensional model. The molding apparatus includes a slice data generation unit to generate slice data from three-dimensional shape data of the three-dimensional model, and a lamination unit to laminate a layer of a molding material on the basis of the slice data. The slice data generation unit analyzes data, and, if a region in which a layer of a second molding material different from
(Continued)

a first molding material is to be laminated on a layer of the first molding material and in which it is difficult to laminate the layers is extracted, modifies the data of a region of at least one of an ith layer and an (i+1)th layer to data in which a portion in which the first molding material is disposed and a portion in which the second molding material is disposed.

16 Claims, 16 Drawing Sheets

(51) Int. Cl.
  *G03G 15/22* (2006.01)
  *B29C 64/205* (2017.01)
  *B33Y 10/00* (2015.01)
  *B33Y 30/00* (2015.01)
  *B29C 64/147* (2017.01)
(52) U.S. Cl.
  CPC ............... *B33Y 10/00* (2014.12); *B33Y 30/00* (2014.12); *G03G 15/224* (2013.01); *G03G 15/225* (2013.01)
(58) Field of Classification Search
  USPC .................... 156/60, 64, 350, 351, 378, 379
  See application file for complete search history.

(56) References Cited

U.S. PATENT DOCUMENTS

| | | | |
|---|---|---|---|
| 8,871,607 | B2 | 10/2014 | Signamarcheix et al. |
| 10,071,527 | B2 | 9/2018 | Travers et al. |
| 2011/0163410 | A1 | 7/2011 | Signamarcheix et al. |
| 2013/0131826 | A1 | 5/2013 | Kato et al. |
| 2014/0374958 | A1* | 12/2014 | Taniuchi ................ B33Y 10/00 264/401 |
| 2015/0134096 | A1 | 5/2015 | Travers et al. |
| 2015/0266235 | A1 | 9/2015 | Page |
| 2016/0074938 | A1 | 3/2016 | Kitani et al. |

FOREIGN PATENT DOCUMENTS

| | | |
|---|---|---|
| CN | 103009631 A | 4/2013 |
| CN | 103100113 A | 5/2013 |
| CN | 104470704 A | 3/2015 |
| EP | 2 599 613 A2 | 6/2013 |
| GB | 2521393 A | 6/2015 |
| JP | H08-511217 A | 11/1996 |
| JP | 2003-159754 A | 6/2003 |
| JP | 2014-227587 A | 12/2014 |
| WO | 2015/091726 A1 | 6/2015 |

OTHER PUBLICATIONS

Nov. 12, 2019 Chinese Official Action in Chinese Patent Appln. No. 201680075034.4.

* cited by examiner

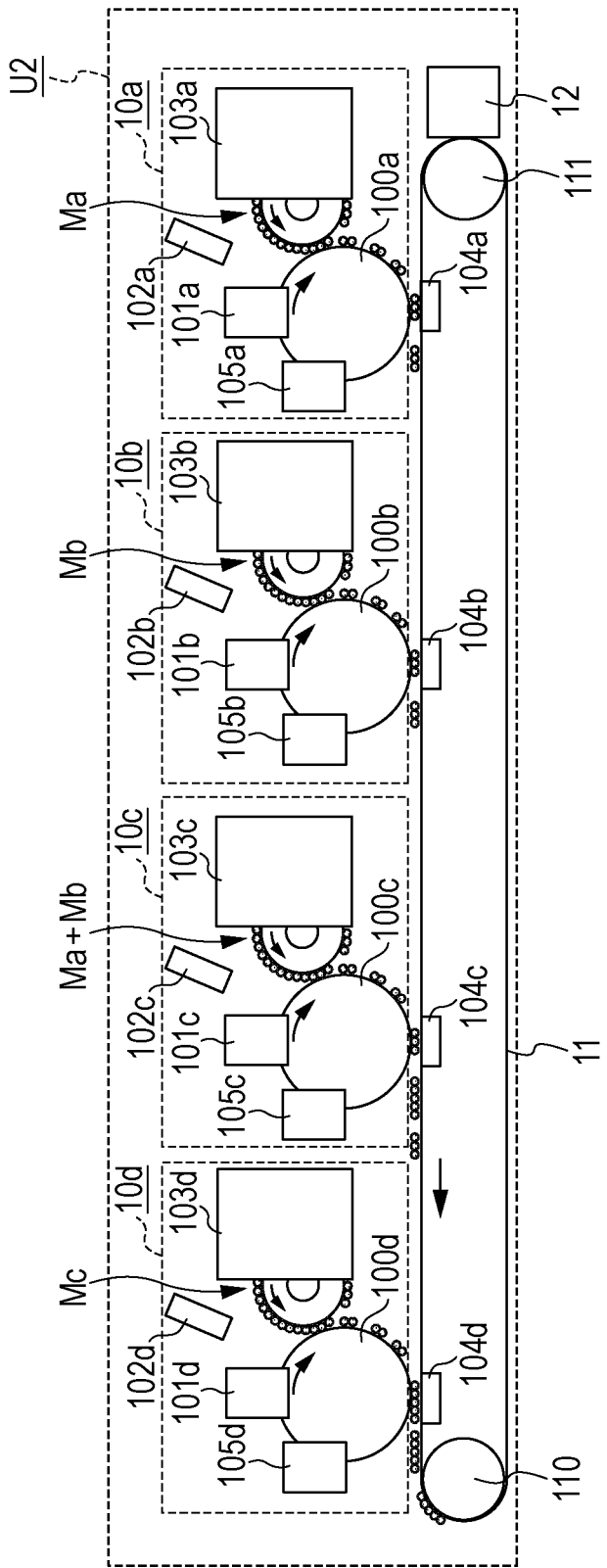

MOLDING SYSTEM, DATA PROCESSING DEVICE FOR GENERATING MOLDING DATA, AND METHOD OF MANUFACTURING THREE-DIMENSIONAL OBJECT

This application is a U.S. national stage application of International Application No. PCT/JP2016/005164, filed Dec. 16, 2016, which claims priority from Japanese Patent Application No. 2015-249088, filed Dec. 21, 2015, and Japanese Patent Application No. 2016-237685 filed Dec. 7, 2016.

TECHNICAL FIELD

The present invention relates to techniques for molding three-dimensional objects and, in particular, relates to a molding technique of a sheet lamination type.

BACKGROUND ART

In recent years, a three-dimensional molding technique called additive manufacturing (AM) technology has received attention. With the AM technology, slice data composed of a plurality of pieces of section data obtained by slicing three-dimensional shape data of a three-dimensional model is generated, a plurality of layers made of a molding material is successively formed on the basis of the slice data, and the layers made of the molding material are laminated and bonded together, whereby a three-dimensional object is molded. Primary molding processes that are known include a vat photopolymerization process, a selective laser sintering process, and a material extrusion process.

PTL 1 or PTL 2 proposes a three-dimensional molding apparatus that laminates one layer at a time. Specifically, described is an apparatus that successively forms a thin layer made of a molding material in accordance with section data of a single layer with the use of an electrophotographic process and laminates each layer to thus manufacture a three-dimensional object.

There is a demand that a molded object whose physical or chemical property is partially varied in accordance with a requirement be manufactured, in order to provide a high-value-added article with the AM technology. PTL 3 proposes a technique for manufacturing an article whose property varies depending on the location therein by laminating layers while varying the mixture ratio of two different types of metal powders in the selective laser sintering process.

CITATION LIST

Patent Literature

PTL 1: U.S. Pat. No. 5,088,047
PTL 2: PCT Japanese Translation Patent Publication No. 8-511217
PTL 3: Japanese Patent Laid-Open No. 2014-227587

SUMMARY OF INVENTION

Technical Problem

In order to manufacture a molded object whose physical or chemical property is partially varied, layers made of different types of materials need to be laminated together. However, depending on the combination of the materials, there may be a case in which the materials are difficult to bond together. Neither PTL 1 nor PTL 2 discloses anything pertaining to such a case. In addition, according to the technique disclosed in PTL 3, each layer is formed by a material whose mixture ratio is uniform, and thus it is not possible to manufacture a molded object having a region within a layer in which different materials are present.

Solution to Problem

In order to solve the above problem, the present invention provides a molding system configured to manufacture a three-dimensional object corresponding to a three-dimensional model, and the molding system includes a slice data generation unit configured to generate slice data from three-dimensional shape data of the three-dimensional model, and a lamination unit configured to laminate a layer of a molding material on the basis of the slice data. The slice data generation unit analyzes data of an ith layer (i is a positive integer) and data of an (i+1)th layer included in the slice data, and, if a region in which a layer of a second molding material that is different from a first molding material is to be laminated on a layer of the first molding material and in which it is difficult to laminate the layers is extracted, modifies data of the region of at least one of the ith layer and the (i+1)th layer to data in which the first molding material and the second molding material are mixed.

In addition, the present invention provides a data processing device configured to generate molding data for manufacturing a three-dimensional object corresponding to a three-dimensional model, and the data processing device includes an acquisition unit configured to acquire three-dimensional shape data of the three-dimensional model, and a slice data generation unit configured to generate slice data from the three-dimensional shape data. The slice data generation unit analyzes data of an ith layer (i is a positive integer) and data of an (i+1)th layer included in the slice data, and, if a region in which a layer of a second molding material that is different from a first molding material is to be laminated on a layer of the first molding material and in which it is difficult to laminate the layers is extracted, modifies data of the region of at least one of the ith layer and the (i+1)th layer to data in which the first molding material and the second molding material are mixed.

Furthermore, the present invention provides a method of manufacturing a three-dimensional object by laminating layers of a molding material in accordance with three-dimensional shape data of a three-dimensional model, and the method includes, in a case in which a region in which layers of molding materials of different types are to be laminated in a size that makes lamination difficult is included, providing a portion in which layers of molding materials of the same type are to be laminated, and laminating the layers such that an interval of a portion in which the layers of the molding materials of different types are laminated and a portion in which the layers of the molding materials of the same type are laminated does not exceed a predetermined value at least in one direction.

Advantageous Effects of Invention

Even in a case of molding that includes a region in which layers of materials that are difficult to bond together are to be laminated together if the molding is carried out in accordance with unmodified slice data that has been generated from a three-dimensional model, applying the present invention thereto makes it possible to laminate the layers together, and thus a molded object with high strength can be manufactured.

Further features of the present invention will become apparent from the following description of exemplary embodiments with reference to the attached drawings.

BRIEF DESCRIPTION OF DRAWINGS

FIG. 10 is a schematic diagram illustrating an example of a material layer forming unit of a molding apparatus according to a second exemplary embodiment.

DESCRIPTION OF EMBODIMENTS

Hereinafter, embodiments for implementing the present invention will be described by way of examples with reference to the drawings. It is to be noted that the dimensions, the materials, the shapes, the relative arrangement, and so on of the members described in the following exemplary embodiments and the procedures, the control parameters, the target values, and so on in various control operations are not intended to limit the scope of the present invention thereto, unless any particular limitations are described.

Figure 1A:
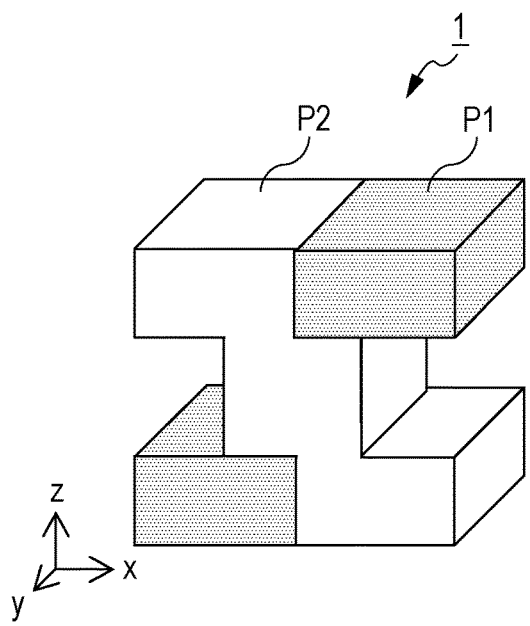
FIG. 1A is an illustration for describing a method of manufacturing a three-dimensional object with the use of an AM technology.

First, an example of molding a three-dimensional model 1 illustrated in FIG. 1A will be briefly described.

The three-dimensional model 1 is constituted by a portion P1 made of a first molding material Ma and a portion P2 made of a second molding material Mb that is of a type different from the first molding material Ma. Herein, a "type" is determined by the chemical structure, and materials having different chemical structures are said to be materials of different types.

Figure 1B:
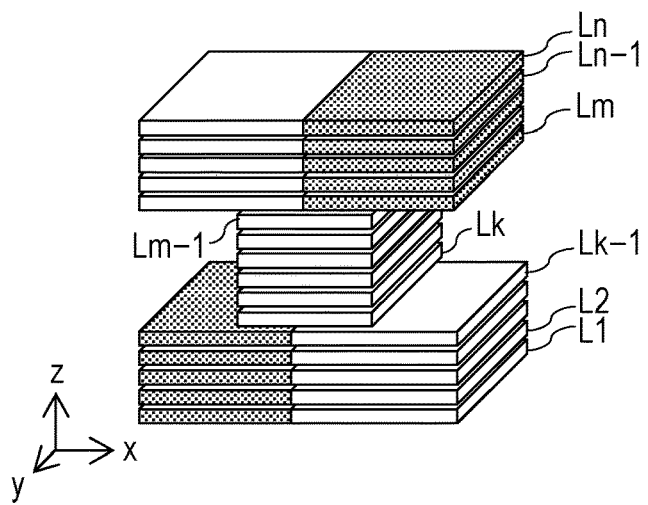
FIG. 1B is an illustration for describing a method of manufacturing a three-dimensional object with the use of an AM technology.

When the three-dimensional model 1 is molded by laminating layers of the molding materials in the Z-direction, as illustrated in FIG. 1B, slice data is created by slicing three-dimensional data of the three-dimensional model 1 at a constant pitch in the Z-direction, and layers of the molding materials are laminated in accordance with the slice data. Here, a first slice (first layer) is represented by L1, and a final slice to be laminated (nth layer) is represented by Ln.

As can be seen from FIG. 1B, a slice Lk (kth layer) through a slice Lm−1 ((m−1)th layer) each have a section smaller than the sections of the other slices in the three-dimensional model 1. This structure leads to a problem in that a slice Lm (mth layer) needs to be laminated on a region for which the section data of the slice Lm−1 ((m−1)th layer) is not present, or in other words, a layer of the molding materials needs to be laminated on a region in which no molding material is present.

In order to solve such a problem, a support portion is added to a portion of the three-dimensional model 1 in which a layer of a molding material needs to be laminated on a region for which no section data is present. A support portion is a portion that is not necessary in a molding target and thus needs to be removed after the molding is completed. Therefore, for example, a method in which a support portion is formed by a material that dissolves in a solvent in which the material constituting the three-dimensional model 1 does not dissolve and only the support portion is selectively removed after the molding is completed is suitably employed.

Hereinafter, a material that constitutes the three-dimensional model 1 serving as a molding target is referred to as a structure material, and a material that constitutes a support portion is referred to as a support material. When the structure material and the support material do not need to be differentiated, these materials are referred to collectively as a molding material.

Figure 1C:
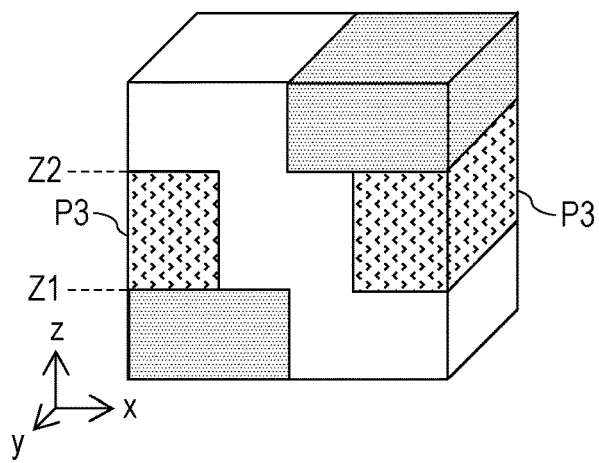
FIG. 1C is an illustration for describing a method of manufacturing a three-dimensional object with the use of an AM technology.

For simplicity, as illustrated in FIG. 1C, an example in which molding is carried out with a support portion P3 made of a third molding material Mc serving as a support material being provided so that the first layer through the nth layer have the same sectional area will be considered. However, the structure of the support portion is not limited to this example, and a structure in which a beam and a pillar are combined can also be employed.

In order to obtain the molded object illustrated in FIG. 1C, slice data is created with information on the support portion being added to the section data of the three-dimensional model 1. The molding materials are disposed in accordance with the slice data so as to form material layers, and these material layers are pressurized while being provided with thermal or optical energy so as to melt the molding materials. Thus, the layers of the molding materials are welded and laminated to each other, and the molding is carried out.

Figure 2A:
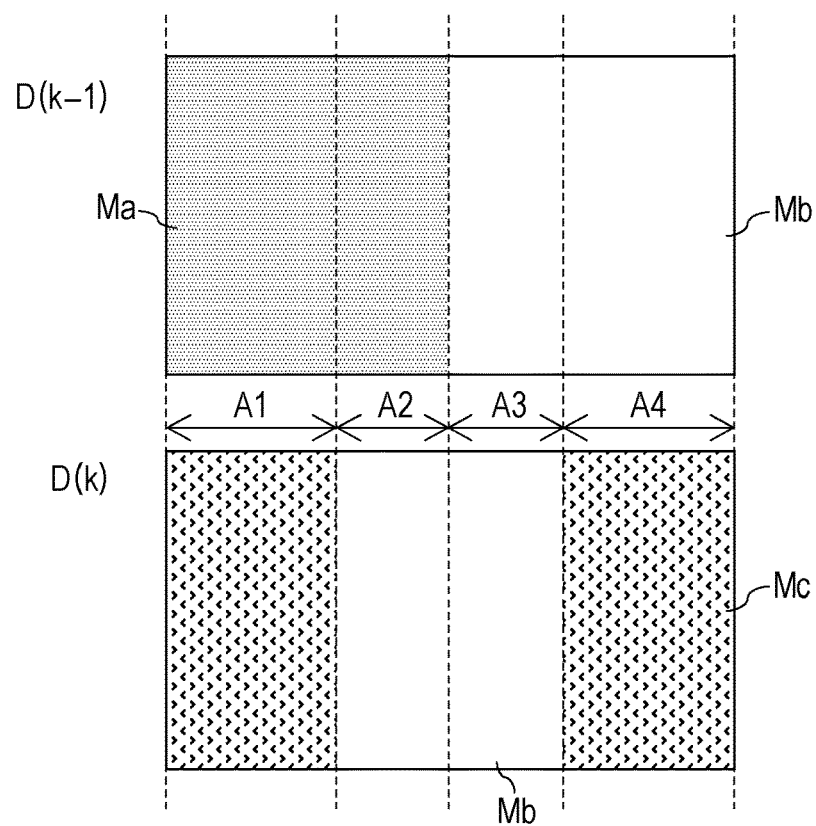
FIG. 2A illustrates an image of slice data of material layers to be welded together.

FIG. 2A illustrates an arrangement of the molding materials represented by data D(k−1) and data D(k) of a (k−1)th layer and a kth layer, respectively, that are to be bonded to each other along a lamination plane Z1 indicated in FIG. 1C. When the (k−1)th layer and the kth layer are laminated together, the first molding material Ma and the third molding material Mc are welded together in a region A1 on the lamination plane Z1, and the first molding material Ma and the second molding material Mb are welded together in a region A2. Furthermore, layers of the second molding material Mb are welded together in a region A3 on the lamination plane Z1, and the second molding material Mb and the third molding material Mc are welded together in a region A4.

Figure 2B:
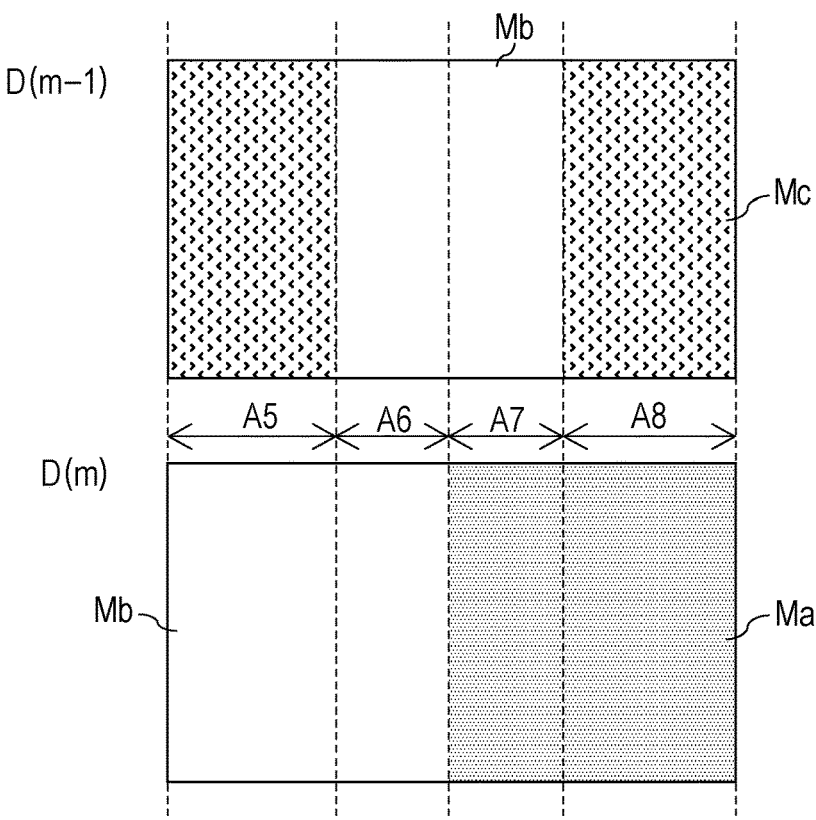
FIG. 2B illustrates an image of slice data of material layers to be welded together.

In a similar manner, FIG. 2B illustrates an arrangement of the molding materials represented by data D(m−1) and data D(m) of an (m−1)th layer and an mth layer, respectively, that are to be bonded to each other along a lamination plane Z2 indicated in FIG. 1C. When the (m−1)th layer and the mth layer are laminated together, the third molding material Mc and the second molding material Mb are welded together in a region A5 on the lamination plane Z2, and layers of the second molding material Mb are welded together in a region A6. Furthermore, the second molding material Mb and the first molding material Ma are welded together in a region A7 on the lamination plane Z2, and the third molding material Mc and the first molding material Ma are welded together in a region A8.

In general, materials of the same type (same type materials) are suitable for being welded together, but materials of different types (different type materials) are often not suitable for being welded together. Since the first molding material Ma, the second molding material Mb, and the third molding material Mc are materials of mutually different types, these materials are hardly suitable for being welded together except for a very limited number of combinations, and even if these materials are welded together, the bonding strength therebetween is low.

As an example, a case in which ABS resin is used as the first molding material Ma, polyacetal resin (POM) is used as the second molding material Mb, and maltotetraose, which is a water-soluble glucide, is used as the third molding material Mc will be considered. POM has high resistance to abrasion and high slidability and excels in mechanical strength. Thus, POM is one of the materials suitable as the structure material but has very poor weldability with other materials. Therefore, good lamination can be obtained in the regions A3 and A6 in which layers of POM are welded together, but lamination cannot be achieved in the regions A4 and A5 in which POM and maltotetraose are welded together and in the regions A2 and A7 in which POM and ABS are welded together. In the regions A1 and A8 in which ABS and maltotetraose are welded together as well, it is difficult to laminate the layers together in a similar manner.

Accordingly, in the present invention, when slice data generated from three-dimensional shape data of a three-dimensional model includes a region with difficulty in lamination in which layers of materials of different types are to be laminated together, the data of the region with difficulty in lamination is partially modified so as to make it possible to laminate the layers together. Specifically, data of at least one of the (k−1)th layer and the kth layer is modified such that a portion in which materials of the same type are welded together and a portion in which materials of different types are welded together are present in a mixed pattern in a region with difficulty in lamination in which layers of materials of different types are to be laminated together along the lamination plane Z1.

Figure 3:
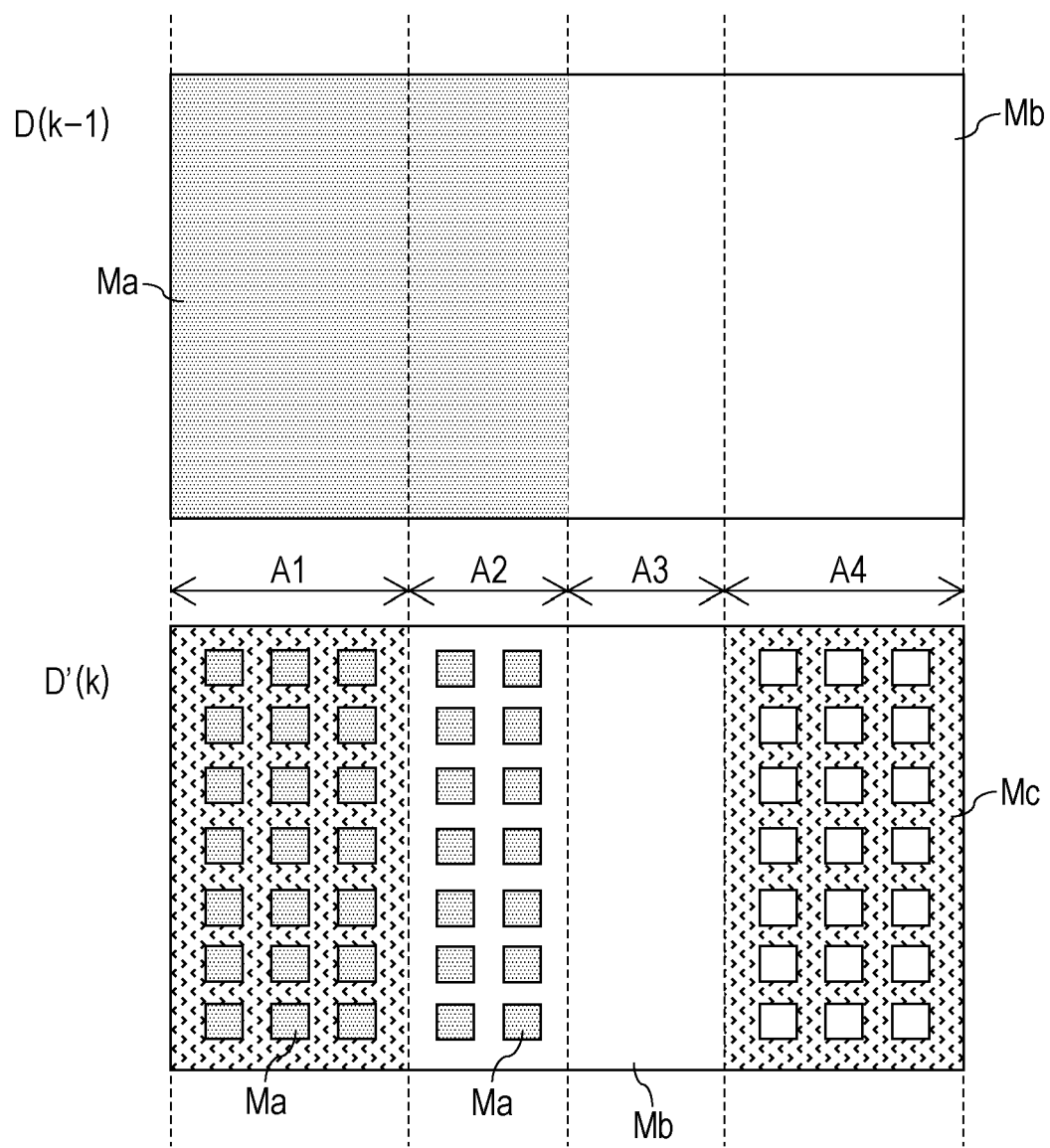
FIG. 3 illustrates an image of slice data that has been modified according to an exemplary embodiment of the present invention.
Figure 4A:
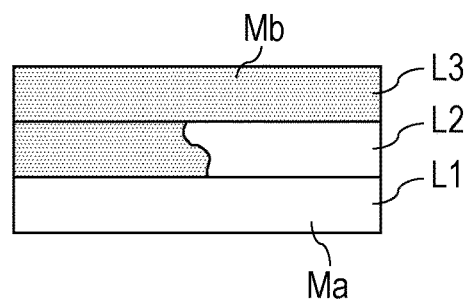
FIG. 4A illustrates a portion in which layers made of different types of molding materials are laminated together.
Figure 4B:
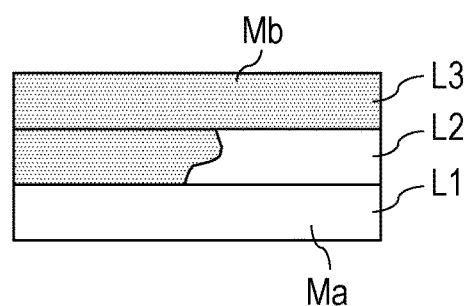
FIG. 4B illustrates a portion in which layers made of different types of molding materials are laminated together.
Figure 4C:
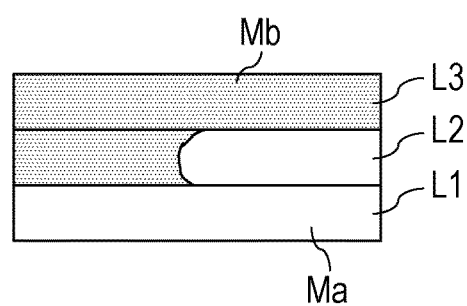
FIG. 4C illustrates a portion in which layers made of different types of molding materials are laminated together.
Figure 4D:
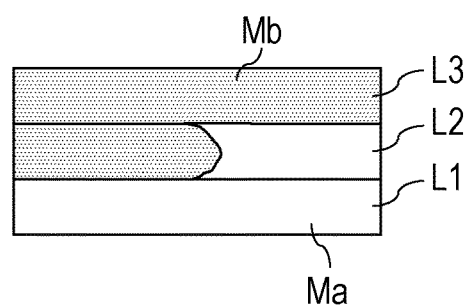
FIG. 4D illustrates a portion in which layers made of different types of molding materials are laminated together.

FIG. 3 illustrates an arrangement example of the molding materials in the data D(k−1) unmodified from the slice data and in data D'(k) modified with the present invention being applied thereto. According to the data D(k) to which the present invention is not applied, only the third molding material Mc is disposed in the region A1, as illustrated in FIG. 2A. However, when the present invention is applied, the region A1 is modified to a region in which the third molding material Mc, which is disposed in the region A1 in the data D(k), and the first molding material Ma disposed in the region A1 in the data D(k−1) are present in a mixed pattern. In a similar manner, the region A2 of the data D(k) is modified to a region in which the second molding material Mb and the first molding material Ma are present in a mixed pattern, and the region A4 of the data D(k) is modified to a region in which the third molding material Mc and the second molding material Mb are present in a mixed pattern. Making such a modification to the data of a region with difficulty in lamination makes it possible to laminate layers that include a region in which layers made of materials of different types are to be laminated together.

An advantageous effect of the present invention is considered to be manifested through the following phenomenon.

FIGS. 4A through 4D are enlarged views of a region in which layers of the first molding material Ma and the second molding material Mb are welded and laminated together in the region A2 of a molded object in which a (k−1)th layer L1, a kth layer L2, and a (k+1)th layer L3 are welded together in this order. Although the boundaries between the layers are made visible in the drawings, in reality, such boundaries are rarely visible.

When a layer in which the first molding material Ma and the second molding material Mb are present in a mixed pattern in the kth layer L2 is laminated on a layer formed of the first molding material Ma in the (k−1)th layer L1, the layers are bonded together firmly in a region in which the first molding material Ma is welded together. On the other hand, the layers may not be welded together or may be welded with low bonding strength in a region in which the first molding material Ma and the second molding material Mb, which is of a type different from the first molding material Ma, are to be welded together.

However, as these regions are provided within the same layer, melted simultaneously, and then solidified, the boundary between the first molding material Ma and the second molding material Mb, which are of mutually different types, is considered to enter any one of the states illustrated in FIGS. 4A through 4D. Accordingly, any one of the states illustrated in FIGS. 4A through 4D randomly occurs at each boundary between the first molding material Ma and the second molding material Mb in the region A2 illustrated in FIG. 3, and the concavity and the convexity of the first molding material Ma and the second molding material Mb fit together and are mechanically coupled to form the kth layer L2. Consequently, it becomes possible to laminate the (k−1)th layer L1 and the kth layer L2 together across the entire surfaces thereof.

The layer made of the second molding material Mb in the (k+1)th layer L3 to be laminated on the kth layer L2 can be bonded firmly at a portion in which the second molding material Mb is welded together. On the other hand, the layers may not be welded together or may be welded with low bonding strength in a portion in which the layer of the second molding material Mb is laminated on the first molding material Ma, which is of a type different from the second molding material Mb.

However, in the present invention, a portion with high bonding strength and a portion with low bonding strength are present in a mixed pattern along a lamination plane, and coupling by a mechanical linkage state is introduced at a boundary between a portion with high welding strength and a portion with low welding strength. Consequently, the kth layer L2 and the (k+1)th layer L3 can be laminated together with high bonding strength. Furthermore, the (k−1)th layer L1 and the (k+1)th layer L3 can be laminated together with high bonding strength as the kth layer L2 is interposed therebetween. Hereinafter, a layer in which the first molding material Ma and the second molding material Mb are made to be present in a mixed pattern, as in the kth layer L2, is referred to as an adhesive layer.

Figure 11:
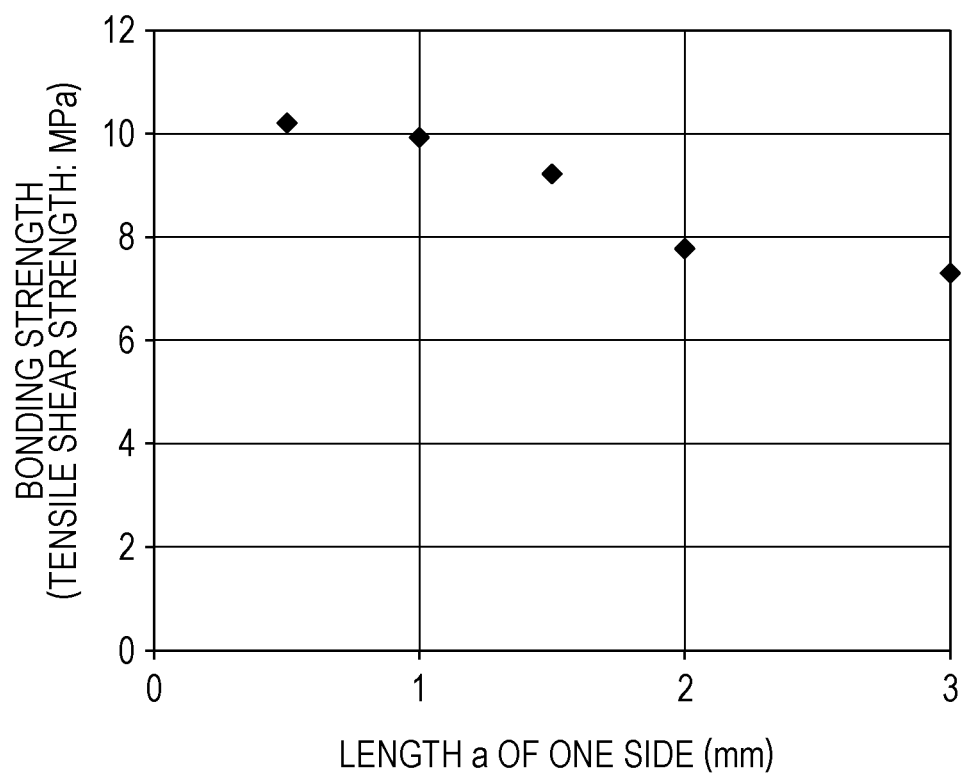
FIG. 11 is a graph illustrating a relationship between the pitch of two types of molding materials and the adhesive strength of an adhesive layer.
Figure 12:
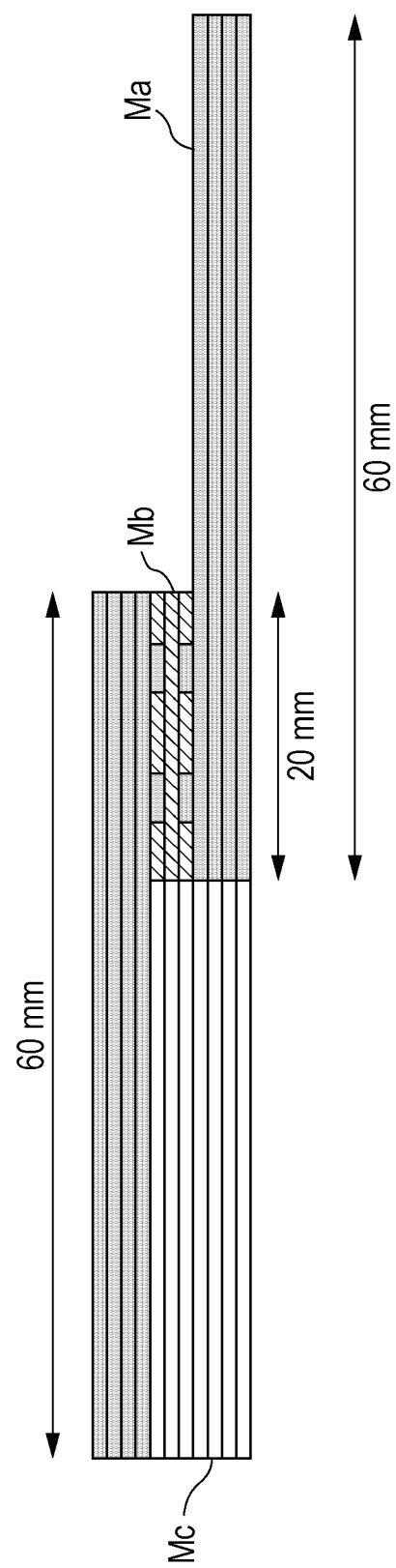
FIG. 12 illustrates a section structure of a sample used in the measurement of FIG. 11.

Although a method of making materials of different types be present in a mixed pattern is not limited to the example of disposing the materials in a pattern illustrated in FIG. 3, it is preferable that the materials of different types be present in a mixed pattern at a small interval so as to ensure the bonding strength between layers. FIG. 11 is a graph illustrating a result of measuring the bonding strength of an adhesive layer while varying the pitch. A sample piece used to evaluate the bonding strength of the adhesive layer is illustrated in FIG. 12. The sample piece was fabricated as follows. One hundred layers each made of ABS resin (Ma) were laminated together, and then an adhesive layer in which ABS resin and POM resin (Mb) were present in a mixed pattern was laminated thereon. Furthermore, a layer made of POM resin was laminated on the adhesive layer, another adhesive layer was laminated on the layer made of POM resin, and another one hundred layers each made of ABS resin were laminated on the adhesive layer. The dimensions of the layers made of ABS resin are 20 mm in width and 60 mm in length. The dimensions of both the adhesive layer and the layer made of POM resin are 20 mm in width and 20 mm in length. A support portion made of a support material (Mc) was provided at an overhang portion and was removed after the lamination was completed. Maltotetraose, which is weakly welded with ABS resin, was used as the support material, and thus it was possible to achieve lamination, though with low bonding strength, even without providing an adhesive layer.

Figure 13:
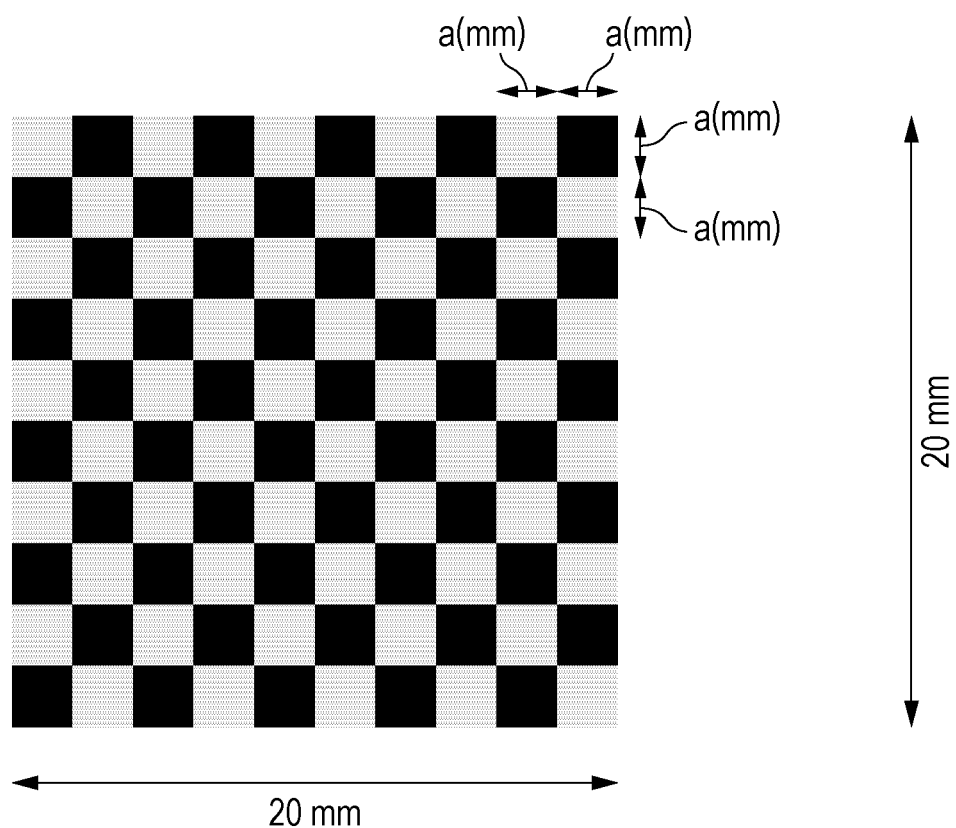
FIG. 13 illustrates a disposition pattern of two types of molding materials in the sample used in the measurement of FIG. 11.

As illustrated in FIG. 13, the adhesive layer was formed to have a pattern (checkered pattern) in which regions in which ABS resin was disposed and regions in which POM resin was disposed each having a square shape with a length (pitch) a [mm] on each side were provided in an alternating manner. Five test pieces with the pitch a varied among 0.5 mm, 1 mm, 1.5 mm, 2 mm, and 3 mm were created, the tensile shear strength of each test piece was measured with the use of Tensilon RTC-125 (manufactured by A&D Company, Limited), and the bonding strength obtained by providing the adhesive layer was evaluated.

Figure 14:
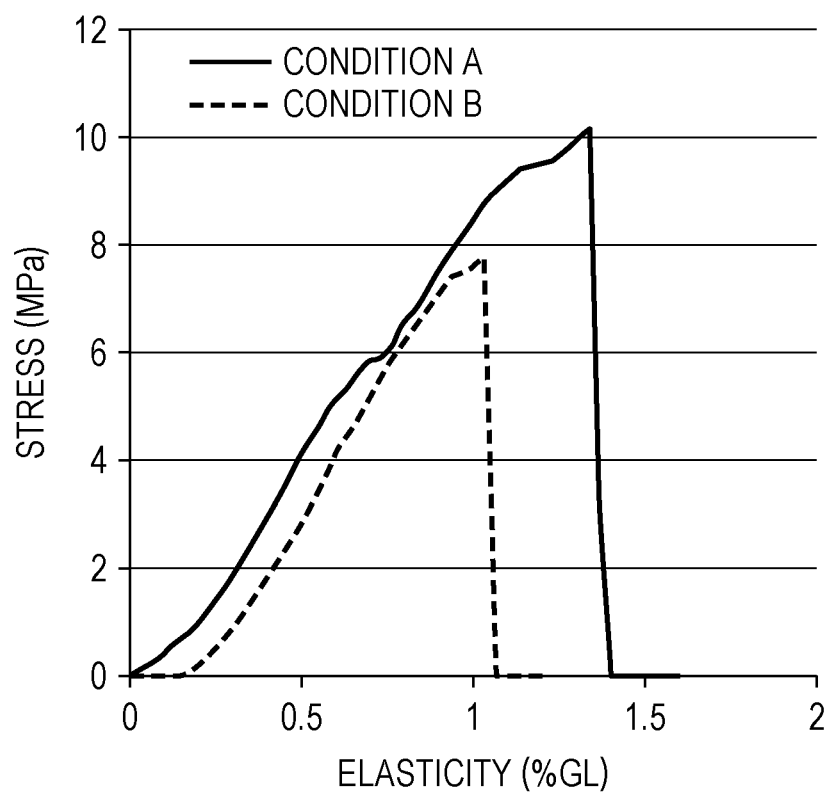
FIG. 14 is a graph illustrating a measurement example of a tensile shear test.

The graph in FIG. 14 illustrates an example of the tensile shear test with Tensilon RTC-125. The condition A in the graph is that the length (pitch) of each side is 0.5 mm, and the condition B is that the length is 2 mm. The point at which the stress is at a maximum in the graph indicates the stress at break, and the stress at break is plotted in the graph in FIG. 11 as the bonding strength. The graph in FIG. 11 reveals that a smaller pitch leads to higher bonding strength and that the bonding strength increases in particular in a range in which the length of each side is less than 2 mm. On the basis of the above, it is preferable that the materials of different types be present in a mixed pattern at a small interval in order to ensure the bonding strength between layers, and it may be particularly preferable that the materials be present in a mixed pattern at an interval of less than 2 mm.

Although an example in which the data of the kth layer is modified is illustrated in FIG. 3, this is not a limiting example. For example, the data of the regions A1, A2, and A4 in the (k−1)th layer may be modified such that the molding materials disposed in the regions A1, A2, and A4 of the kth layer to be laminated on the (k−1)th layer are present in a mixed pattern in the (k−1)th layer. Alternatively, data may be modified such that patterns are changed in both the (k−1)th layer and the kth layer and the materials of different types are present in a mixed pattern in both layers. However, in a case in which an adhesive layer is provided in a region in which a layer of a support material and a layer of a structure material are to be laminated together, as in the region A5 or A8 illustrated in FIG. 2B, it is preferable that the data be modified such that the regions A5 and A8 of the (m−1)th layer on the side of the support material become adhesive layers. Such a method makes it possible to remove any unevenness that could be generated on the surface of a molding target due to the modification to the slice data through postprocessing.

Hereinafter, exemplary embodiments of the present invention will be described in detail.

First Exemplary Embodiment

Overall Configuration of Molding System

Figure 5:
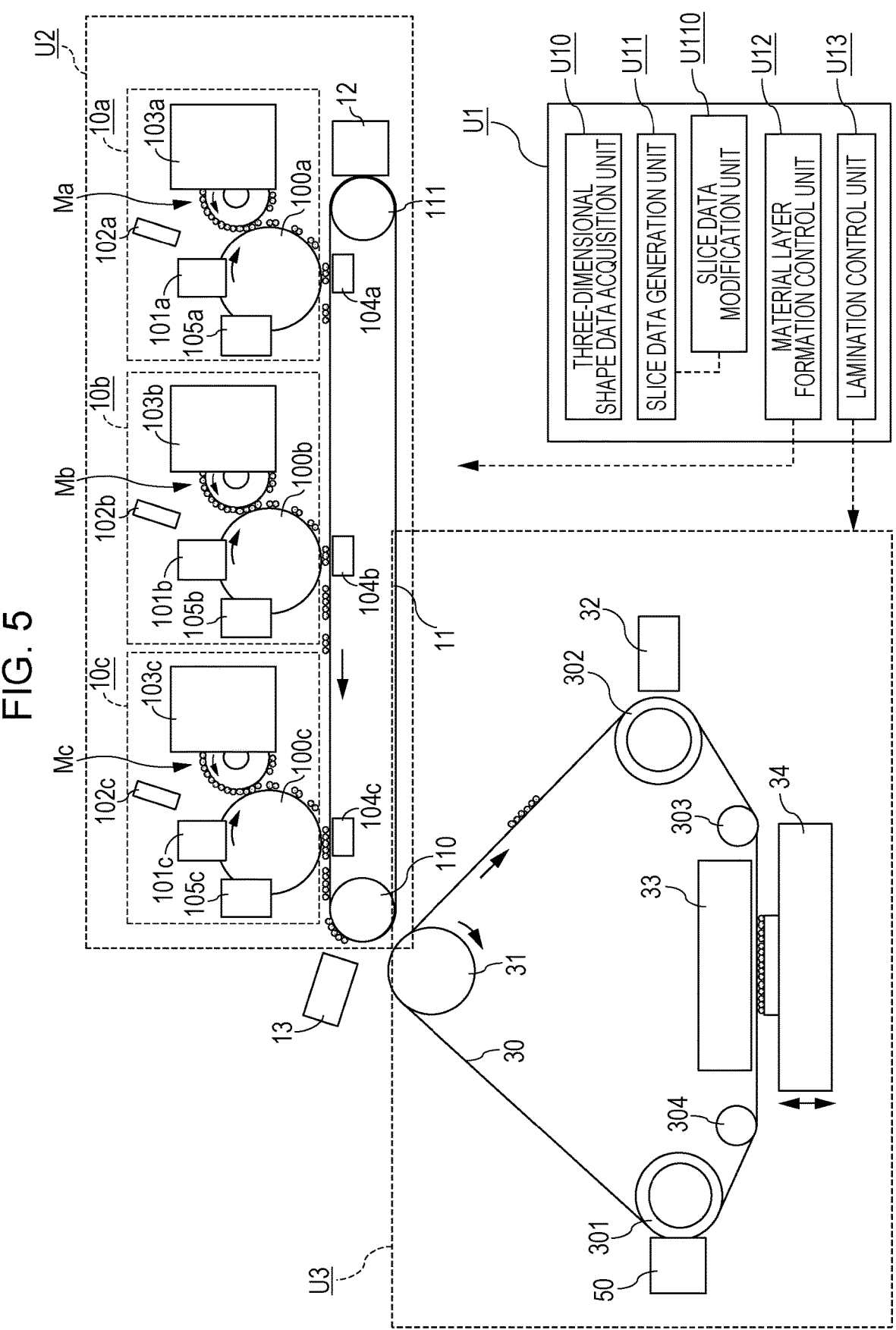
FIG. 5 is a schematic diagram illustrating an overall configuration of a molding system according to an exemplary embodiment of the present invention.

First, an overall configuration of a molding system according to an exemplary embodiment of the present invention will be described. FIG. 5 schematically illustrates an overall configuration of a molding apparatus serving as an example of the molding system.

The molding apparatus according to the present exemplary embodiment is an AM system of a type that manufactures a three-dimensional object by laminating a material layer in which a material is disposed two-dimensionally.

As illustrated in FIG. 5, the molding apparatus includes a control unit U1, a material layer forming unit U2, and a lamination unit U3. The control unit U1 carries out processing of generating slice data from three-dimensional shape data of a molding target, control of each unit of the molding apparatus, and so on. The material layer forming unit U2 forms a material layer made of a molding material with the use of, for example, an electrophotographic process. The lamination unit U3 forms a three-dimensional object by sequentially laminating and firmly bonding together a plurality of material layers formed by the material layer forming unit U2.

The units U1 through U3 may each be housed in a separate housing or may be housed in a single housing. It is to be noted that the unit configuration illustrated in FIG. 5 is merely an example and a different configuration may also be employed.

Control Unit

The configuration of the control unit U1 will be described. As illustrated in FIG. 5, the control unit U1 includes a three-dimensional shape data acquisition unit U10 and a slice data generation unit U11 and functions as a data processing device for generating molding data. The control unit U1 further includes a material layer formation control unit U12 and a lamination control unit U13 and also functions as a control device. The slice data generation unit U11 includes a slice data modification unit U110.

The three-dimensional shape data acquisition unit U10 has a function of accepting three-dimensional shape data of a three-dimensional model (molding target) from the outside. Data created or output by a 3D CAD, a 3D modeler, a 3C scanner, or the like can be used as the three-dimensional shape data. The file format of the data is not particularly limited, and the STL (StereoLithography) file format, for example, can be used preferably.

The slice data generation unit U11 slices the three-dimensional model expressed by the three-dimensional shape data at a predetermined pitch in a predetermined direction, calculates the sectional shape of each layer, and generates slice information, which is necessary when the material layer forming unit U2 forms a material layer, on the basis of the obtained sectional shape. The slice information includes information on each slice, such as the type, the color, and the arrangement of molding materials. Furthermore, the slice data generation unit U11 analyzes the three-dimensional shape data or the slice information to determine whether an overhang portion (portion in which no material is present along a lamination plane) is present and generates slice data by adding information for disposing a support material as necessary. Here, the slice data refers to a data group that includes information such as the type, the color, and the arrangement of the structure material and the support material in each layer.

In addition, the slice data generation unit U11 analyzes data of the layers that are in contact with each other and to be laminated together to extract a region in which layers of materials of different types are to be laminated. If it is determined that the lamination is difficult in the extracted region, the slice data modification unit U110 modifies the data of at least one of the layers that are in contact with each other and to be laminated together to data for adhesion. The data for adhesion as used herein is data obtained by modifying the data of a region in which layers of materials of different types are to be laminated together according to unmodified slice data generated from three-dimensional shape data of a three-dimensional model to a region in which the materials of different types are present in a mixed pattern within a layer.

Although the details will be described later, the material layer forming unit U2 according to the present exemplary embodiment can form a material layer with a plurality of types of molding materials. Therefore, slice data includes data corresponding to an image (arrangement) of each molding material. The file format of the slice data can be, for example, multivalued image data (each value represents the type of a material) or a multiplane image data (each plane corresponds to the type of a material).

The material layer formation control unit U12 has a function of controlling a material layer forming process of the material layer forming unit U2 on the basis of the slice data generated by the slice data generation unit U1 or the data modified to include data for adhesion. The lamination control unit U13 has a function of controlling a lamination process of the lamination unit U3. Specific contents of the control of each unit will be described later.

Although not illustrated in the drawing, the control unit U1 further includes an operation unit, a display unit, and a storage unit. The operation unit is a function of accepting an instruction from a user. For example, an input of on/off of a power source, various settings of the apparatus, an operation instruction, and so on is possible. The display unit has a function of presenting information to a user. For example, various setting screens, an error message, an operation status, and so on can be presented. The storage unit has a function of storing three-dimensional shape data, slice data, various setting values, and so on.

The control unit U1 can be constituted by hardware pieces such as a central processing unit (CPU), a memory, an auxiliary storage device (hard disk, flash memory, etc.), an input device, a display device, and a computer provided with various I/Fs. The functions U10 through U13 and U110 described above are implemented as a CPU loads a program stored in an auxiliary storage device or the like and executes the program to control necessary devices. Some or all of the functions described above may instead be constituted by a circuit such as an application specific integrated circuit (ASIC) or a field-programmable gate array (FPGA) or may be executed by another computer with the use of a technology such as cloud computing or grid computing.

Material Layer Forming Unit

Next, the configuration of the material layer forming unit U2 will be described. The material layer forming unit U2 is a unit that forms a material layer made of particles of a molding material with the use of an electrophotographic process. The electrophotographic process is a technique of forming a desired image through a series of processes of charging a photosensitive member, forming a latent image through exposure, causing developer particles to adhere to the latent image, and forming a developer image. The principle of the electrophotographic process is common to that used in a 2D printer, such as a copier. However, a material used as the developer in a three-dimensional molding apparatus has characteristics different from those of a toner material, and thus it is often the case that the process control or the member structure in a 2D printer cannot be used without a modification.

As illustrated in FIG. 5, the material layer forming unit U2 includes a first material image forming unit 10a, a second material image forming unit 10b, a third material image forming unit 10c, a first conveyance member 11, a conveyance member cleaning device 12, and an image detection sensor 13. The first material image forming unit 10a is an image forming unit for forming a material image by using a first molding material Ma and includes an image carrying member 100a, a charging device 101a, an exposure device 102a, a developing device 103a, a transfer device 104a, and a cleaning device 105a. The second material image forming unit 10b and the third material image forming unit 10c each have a configuration similar to that of the first material image forming unit 10a.

In the present exemplary embodiment, a typical thermoplastic resin is used as the first molding material Ma, a thermoplastic resin with difficulty in bonding is used as the second molding material Mb, and a thermoplastic water-soluble material is used as the third molding material Mc. The first molding material Ma and the second molding material Mb are structure materials, and the third molding material Mc is a support material.

Examples of a typical thermoplastic resin include ABS and PS (polystyrene), examples of a thermoplastic resin with difficulty in bonding include POM (polyacetal), PE (polyethylene), and PP (polypropylene). The first and second molding materials can each be selected from the corresponding one of the above examples. Examples of a support material include a glucide, polylactic acid (PLA), PVA (polyvinyl alcohol), and PEG (polyethylene glycol), and more specific examples of a glucide include sucrose, lactose, maltose, and maltotetraose. Each of the molding materials are suitably used in the form of powder made of particles having a mean particle size of no less than 5 µm nor more than 50 µm, and from the viewpoint of the molding accuracy and the molding speed, powder made of particles having a mean particle size of no less than 15 µm nor more than 30 µm is more suitably used.

The material image forming units 10a, 10b, and 10c are disposed along the surface of the first conveyance member 11. Although the material image forming unit 10a for the first molding material is disposed at the most upstream side in the conveyance direction in FIG. 5, the order in which the material image forming units are disposed can be set as desired. In addition, the number of the material image forming units may be more than three and can be increased as appropriate in accordance with the types of the molding materials to be used. By combining a plurality of types of materials that differ in the quality, the color, the hardness, the physical properties, and so on, a greater variety of three-dimensional objects can be manufactured. Such a point that this system excels in the expandability can be said to be an advantage of a molding apparatus that uses an electrophotographic process.

Hereinafter, the configuration of each unit of the material layer forming unit U2 will be described in detail. In the description common to the material image forming units 10a through 10c, the letters a through c appended to the reference numbers of the constituent elements are omitted, and the expressions such as the material image forming unit 10 and the image carrying member 100 will be used.

Image Carrying Member

Figure 6A:
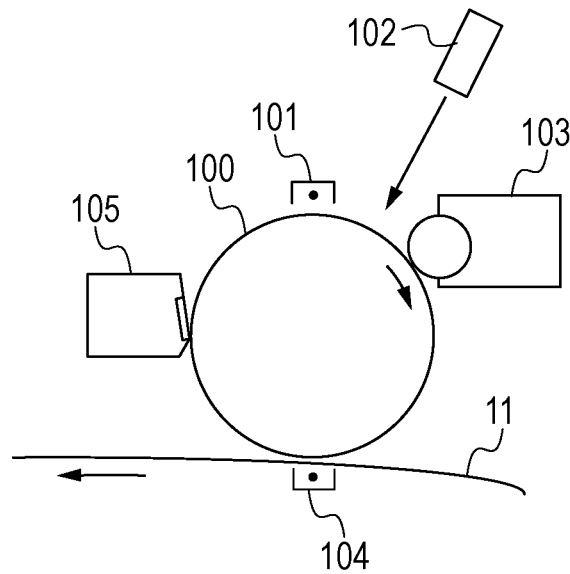
FIG. 6A illustrates a configuration of a material image forming unit of a molding system according to an exemplary embodiment of the present invention.
Figure 6B:
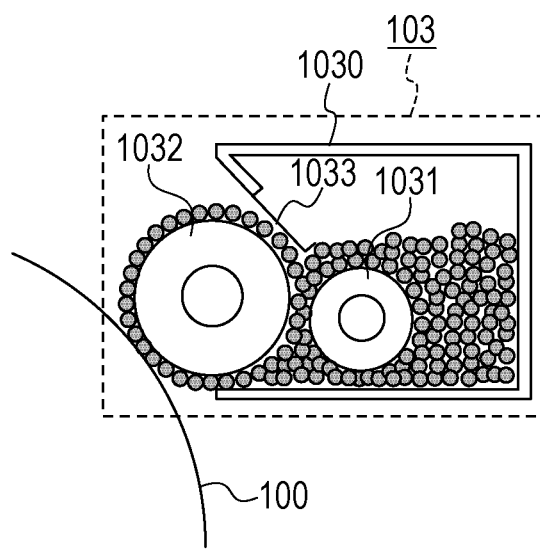
FIG. 6B illustrates a configuration of a material image forming unit of a molding system according to an exemplary embodiment of the present invention.

FIG. 6A illustrates a configuration of the material image forming unit 10, and FIG. 6B illustrates a detailed configuration of the developing device 103.

The image carrying member 100 is a member for carrying an electrostatic latent image. Herein, a photosensitive drum in which a photosensitive layer having photoconductivity is formed on an outer peripheral surface of a cylinder made of metal such as aluminum is used. As a photoconductor, an organic photoconductor (OPC), an amorphous silicon photoconductor, a selenium photoconductor, or the like can be used, and the type of a photoconductor may be selected as appropriate in accordance with the intended use or the required performance of the three-dimensional molding apparatus. The image carrying member 100 is rotatably supported by a frame (not illustrated) and rotates at a constant speed in the clockwise direction in the drawing with a motor (not illustrated) when forming an image.

Charging Device

The charging device 101 is a charging unit for charging the surface of the image carrying member 100 uniformly. Although a contactless charging method through a corona discharge is used in the present exemplary embodiment, another charging method such as a roller charging method in which a charging roller is brought into contact with the surface of the image carrying member 100 may also be used.

Exposure Device

The exposure device 102 is an exposure unit that exposes the image carrying member 100 in accordance with image information (slice data) and forms an electrostatic latent image on the surface of the image carrying member 100. The exposure device 102 is constituted, for example, by a light source, such as a semiconductor laser or a light-emitting diode, a scanning mechanism constituted by a polygon mirror that rotates at high speed, and an optical member, such as an imaging lens.

Developing Device

The developing device 103 is a developing unit that visualizes an electrostatic latent image by supplying developer (herein, powders of the first, second, and third molding materials) to the image carrying member 100 (in the present specification, an image visualized by the developer is referred to as a material image). FIG. 6B illustrates the detailed configuration of the developing device 103. The developing device 103 includes a receptacle 1030 that stores the developer, a supply roller 1031 provided inside the receptacle 1030, a developing roller 1032 that carries the developer and supplies the developer to the image carrying member 100, and a regulating member 1033 that regulates the thickness of the developer. The supply roller 1031 and the developing roller 1032 are rotatably supported by the receptacle 1030 and rotate at a constant speed in the counterclockwise direction in the drawing with a motor (not illustrated) when forming an image. Powder of the developer that has been stirred and charged by the supply roller 1031 is supplied to the developing roller 1032 and has its layer thickness regulated by the regulating member 1033 to have a thickness substantially equivalent to the particle size of one particle. Then, the electrostatic latent image is developed at a portion in which the developing roller 1032 and the image carrying member 100 oppose each other. Developing methods include a reversal development method in which the developer is made to adhere to a portion from which electric charges have been removed through exposure and a regular development method in which the developer is made to adhere to a portion that has not been exposed, and either method may be employed.

The developing device 103 may have a so-called developing cartridge structure and may be provided detachably to the material layer forming unit U2. This makes it easier to replenish or change the molding material (first, second, or third molding material) by replacing the cartridge. Alternatively, the image carrying member 100, the developing device 103, the cleaning device 105, and so on may be integrated into a cartridge (so-called process cartridge), and the image carrying member itself may be made replaceable. In a case in which the wear or the lifetime of the image carrying member 100 is particularly a problem depending on the type, the hardness, the particle size of the structure material or the support material, the process cartridge configuration is more advantageous in terms of the utility and the convenience.

Transfer Device

The transfer device 104 is a transfer unit that transfers a material image on the image carrying member 100 onto the surface of the first conveyance belt 11. The transfer device 104 is disposed so as to oppose the image carrying member 100 with the first conveyance belt 11 interposed therebetween and electrostatically transfers the material image onto the first conveyance belt 11 by applying a voltage of a polarity that is opposite to the polarity of the material image on the image carrying member 100. The transfer from the image carrying member 100 onto the first conveyance belt 11 is also referred to as a primary transfer. Although a transfer method that uses a corona discharge is used in the present exemplary embodiment, a roller transfer method or another transfer method other than the electrostatic transfer method may also be used.

Cleaning Device

The cleaning device 105 is a unit that collects residual developer on the image carrying member 100 that has not been transferred and cleans the surface of the image carrying member 100. Although the cleaning device 105 of a blade type that scrapes the developer by a cleaning blade that is made to abut against the image carrying member 100 in a counter direction is employed in the present exemplary embodiment, another cleaning device of a brush type or of an electrostatic adsorption type may also be used.

First Conveyance Belt

The first conveyance belt 11 is a carrying conveyance member onto which a material image formed by each material image forming unit 10 is transferred. A material image of the first molding material is transferred first from the material image forming unit 10a located upstream in the conveyance direction of the first conveyance belt. Then, a material image of the second molding material from the material image forming unit 10b located downstream from the material image forming unit 10a and a material image of the third molding material (support material) from the material image forming unit 10c located further downstream are transferred so as to be registered with the material image of the first molding material. With this, a single material layer made of the first through third molding materials is formed on the surface of the first conveyance belt 11. At this point, the position and the size of each material image may be adjusted when the slice data is generated so that the material images do not overlap each other. Then, a variation in the thickness of the material layer that could be caused as the material images overlap each other can be suppressed as much as possible.

The first conveyance belt 11 is an endless belt made of a resin material, such as polyimide, and is stretched over a plurality of rollers 110 and 111, as illustrated in FIG. 5. A tension roller, aside from the rollers 110 and 111, may also be provided, and the tension of the first conveyance belt 11 may be made adjustable. At least one of the rollers 110 and 111 is a driving roller and rotates the first conveyance belt 11 in the counterclockwise direction in the drawing with driving force of a motor (not illustrated) when forming an image. In addition, the roller 110 is a roller that forms a secondary transfer portion between a secondary transfer roller 31 of the lamination unit U3 and the roller 110.

Although an endless belt is employed as the first conveyance member herein, this is not a limiting example, and a plate-like conveyance member can also be employed.

Belt Cleaning Device

The belt cleaning device 12 is a unit that cleans a residual material on the surface of the first conveyance belt 11. Although a blade method in which a material on the first conveyance belt 11 is scraped by a cleaning blade that is made to abut against the first conveyance belt 11 in a counter direction is employed in the present exemplary embodiment, another cleaning device of a brush type or of an electrostatic adsorption type may also be used.

Image Detection Sensor 13

The image detection sensor 13 is a detection unit that acquires information pertaining to a material layer carried on the surface of the first conveyance belt 11. The detection result of the image detection sensor 13 is used to register the material layer, to control the timing with the lamination unit U3 of a later stage, or to detect any abnormality pertaining to the shape, the thickness, the position, or the like of the material layer.

Thus far, the material layer forming unit that uses an electrophotographic process has been described, but the material layer forming unit may be configured to employ any other processes, such as an inkjet process, as long as a plurality of materials can be disposed at predetermined positions.

Lamination Unit

Next, the configuration of the lamination unit U3 will be described. The lamination unit U3 is a portion that receives a material layer formed by the material layer forming unit U2 from the first conveyance belt 11 and forms a three-dimensional object by sequentially laminating and firmly bonding the received material layer.

As illustrated in FIG. 5, the lamination unit U3 includes a second conveyance member (belt) 30, a secondary transfer roller 31, an image detection sensor 32, a heater 33, and a stage 34. Hereinafter, the configuration of each unit of the lamination unit U3 will be described in detail.

Second Conveyance Belt

The second conveyance belt 30 is a second carrying conveyance member that receives a material layer formed by the material layer forming unit U2 from the first conveyance belt 11 and conveys the received material layer to a lamination position. The lamination position is a position at which a material layer is brought into contact with a lamination surface in order to stack the material layer onto the stage or onto the lamination surface of a molded object that is being manufactured. In the configuration illustrated in FIG. 5, the portion at which the second conveyance belt 30 is nipped by the heater 33 and the stage 34 corresponds to the lamination position.

The second conveyance belt 30 is an endless belt made of a material having a heat resisting property, such as metal or polyimide, and is stretched over the secondary transfer roller 31 and a plurality of rollers 301, 302, 303, and 304, as illustrated in FIG. 5. At least one of the rollers 31, 301, and 302 is a driving roller and rotates the second conveyance belt 30 in the clockwise direction in the drawing with driving force of a motor (not illustrated). The rollers 303 and 304 form a roller pair that plays a roll of adjusting the tension of the second conveyance belt 30 and keeping the second conveyance belt 30 passing through the lamination position (i.e., the material layer when being laminated) flat.

The second conveyance member 30 is not limited to an endless belt, either, and a plate-like mode can also be employed. In addition, although the exemplary apparatus illustrated in FIG. 5 includes a plurality of conveyance members (first and second conveyance members), a configuration in which the second conveyance member or the first conveyance member is omitted may also be employed.

Secondary Transfer Roller

The secondary transfer roller 31 is a transfer unit for transferring a material layer from the first conveyance belt 11 of the material layer forming unit U2 to the second conveyance belt 30 of the lamination unit U3. The secondary transfer roller 31 forms a secondary transfer nip between the first conveyance belt 11 and the second conveyance belt 30 by nipping the first conveyance belt 11 and the second conveyance belt 30 with the opposing roller 110 of the material layer forming unit U2. A bias of a polarity opposite to the polarity of the material layer is applied to the secondary transfer roller 31 from a power source (not illustrated), and thus the material layer is transferred onto the second conveyance belt 30.

Image Detection Sensor 32

The image detection sensor 32 is a detection unit that reads information pertaining to a material layer carried on the surface of the second conveyance belt 30. The detection result of the image detection sensor 32 is used to register the material layer or to control the conveyance timing to the lamination position.

Heater

The heater 33 is a temperature control unit that controls the temperature of a material layer conveyed to the lamination position. As the heater 33, for example, a ceramic heater, a halogen heater, or the like can be used. In addition, aside from a configuration for heating, a configuration for actively lower the temperature of the material layer by dissipating heat from or cooling the material layer may also be provided. The lower surface (the surface toward the belt) of the heater 33 is flat and also plays a role of a guide for the second conveyance belt 30 passing through the lamination position and a role of a pressurizing member that applies a uniform pressure to the material layer.

Stage

The stage 34 is a flat stage on which a molded object is formed. The stage 34 is movable in the vertical direction (the direction perpendicular to the belt surface at the lamination position) by an actuator (not illustrated). As the material layer conveyed to the lamination position is nipped by the stage 34 and the heater 33, heated, and pressurized (subjected to heat dissipation or cooling as necessary), the material layer is transferred from the second conveyance belt 30 to the stage 34. A first material layer is transferred onto the stage 34, and a second material layer and thereafter are stacked onto the molded object being manufactured on the stage 34. In this manner, in the present exemplary embodiment, the heater 33 and the stage 34 constitute a lamination device that laminates a material layer.

Operation of Molding Apparatus

Figure 7:
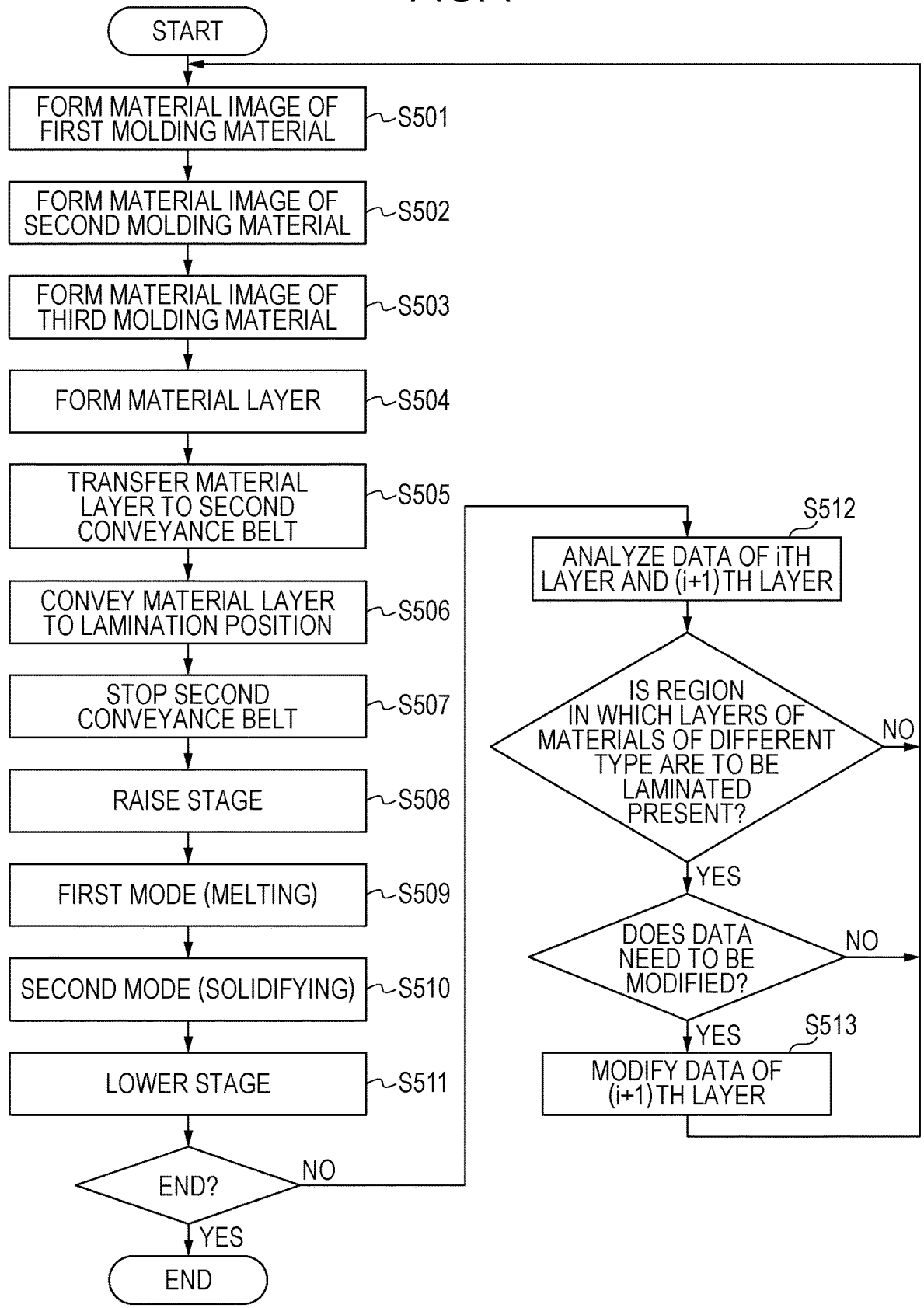
FIG. 7 is a flowchart illustrating an operation sequence of a molding system according to an exemplary embodiment of the present invention.

Next, an operation of the molding apparatus having the configuration described above will be described. Herein, the description is based on the premise that the processing of generating first slice data by the slice data generation unit U11 has been completed, and a process of forming a material layer in each layer and a process of laminating the material layer will be described in sequence. FIG. 7 is a flowchart illustrating an operation sequence example of the molding apparatus according to the present exemplary embodiment.

Material Layer Forming Process

First, the control unit U1 controls driving sources such as motors so that the image carrying member 100 of each material image forming unit 10, the first conveyance belt 11, and the second conveyance belt 30 rotate synchronously at the same outer circumferential speed (process speed).

After the rotation speed stabilizes, the material image forming unit 10a on the most upstream side starts forming an image (S501). Specifically, the control unit U1 controls the charging device 101a and charges the entire surface of the image carrying member 100a substantially uniformly to a predetermined polarity and at a predetermined charging potential. Then, the control unit U1 exposes the surface of the charged image carrying member 100a with the exposure device 102a. Here, electric charges are removed through the exposure, and thus a potential difference is produced between an exposed portion and a non-exposed portion. An image formed by this potential difference is an electrostatic latent image. In the meantime, the control unit U1 drives the developing device 103a to cause the powder of the structure material to adhere to the latent image on the image carrying member 100a and forms an image of the structure material. This material image undergoes a primary transfer onto the first conveyance belt 11 by the transfer device 104a.

In addition, the control unit U1 starts image formation of the material image forming units 10b and 10c located downstream from the material image forming unit 10a with a predetermined time difference from the start of the image formation of the material image forming unit 10a (S502, S503). The image formation of the material image forming units 10b and 10c is carried out in procedures similar to the procedures of the image formation of the material image forming unit 10a. Here, the time difference from the start of the image formation is set to a value obtained by dividing the distance from a primary transfer nip in the material image forming unit 10a on the upstream side to a primary transfer nip in the material image forming unit 10b or 10c on the downstream side by the process speed. With this, two material images formed by each of the material image forming units 10a, 10b, and 10c are registered and transferred on the first conveyance belt 11, and thus a single material layer made of the two types of structure materials and the support material is formed (S504). Here, the formed material layer is referred to as an ith material layer (i is a positive integer). In the case of a section in which no overhang portion is present and a support portion is not necessary, the image formation of the material image forming unit 10c is not carried out. In that case, a material layer is formed only by material images of the first and second structure materials. The material layer formed in this manner is conveyed to the lamination unit U3 by the first conveyance belt 11.

ith Layer Lamination Process

While the operation of forming a material layer is carried out as described above, the second conveyance belt 30 of the lamination unit U3 rotates synchronously at the same outer circumferential speed (process speed) in a state in which the second conveyance belt 30 is in contact with the first conveyance belt 11. Then, at the timing at which a leading edge of the material layer on the first conveyance belt 11 reaches the secondary transfer nip, the control unit U1 applies a predetermined transfer bias to the secondary transfer roller 31 and causes the ith material layer to be transferred onto the second conveyance belt 30 (S505).

The second conveyance belt 30 continues rotating at the same process speed and conveys the ith material layer in the direction indicated by the arrow in FIG. 5. Then, the position of the material layer on the second conveyance belt 30 is detected by the image detection sensor 32. The control unit U1 conveys the material layer on the basis of the detection result (S506), and the second conveyance belt 30 is stopped at a timing at which the ith material layer reaches the lamination position (S507). Thereafter, the control unit U1 raises the stage 34 to bring the stage 34 closer to the second conveyance belt 30 and brings the lamination surface into contact with the ith material layer on the second conveyance belt 30 (S508).

In this state, the control unit U1 controls the temperature of the heater 33 in accordance with a predetermined temperature control sequence. Specifically, a first mode of raising the temperature of the heater 33 to a first target temperature is carried out for a predetermined period of time, and the molding materials in the material layer are thermally melted (S509). With this, the material layer is softened, and the softened material layer and the lamination surface come into tight contact. Thereafter, a second mode of controlling the temperature of the heater 33 to a second target temperature that is lower than the first target temperature is carried out for a predetermined period of time, and the softened material layer is solidified onto the lamination surface, which is then peeled off from the surface of the second conveyance belt 30 (S510), and the stage 34 is lowered (S511).

Here, the temperature control sequence, the target temperatures, the heating time, and so on are set in accordance with the characteristics of the first through third molding materials used to form the material layer. For example, the first target temperature in the first mode is set to a value higher than the highest temperature among the melting points of the materials used to form the material layer or the glass transition point. Meanwhile, the second target temperature in the second mode is set to a value lower than the lowest temperature among the crystallization temperatures of the materials used to form the material layer or the glass transition point of an amorphous material. Such temperature control makes it possible to soften the entire material layer in which a plurality of types of particulate materials with different thermal melting properties in a common melting temperature range and to then solidify the entirety in a common solidification temperature range. Thus, a material layer in which a plurality of types of molding materials are present in a mixed pattern can be melted and solidified in a stable manner.

(i+1)th Layer Forming Process

Subsequently, a process of forming an (i+1)th material layer to be laminated next is started, and at this point, the slice data generation unit U11 analyzes data of the ith material layer that has been laminated and the data of the (i+1)th material layer to be laminated next (S512). It is determined whether the lamination surfaces of the ith material layer and the (i+1)th material layer include a region in which layers of material of different types are to be laminated, and if it is determined that the lamination surfaces include such a region, it is determined whether the lamination in that region is difficult. If it is determined that the lamination is difficult in that region, it is determined that the data needs to be modified. Whether the lamination is difficult or not may be determined on the basis of the lamination compatibility obtained in advance with respect to the materials of different types to be laminated and the size that makes the lamination difficult. If it is determined that the data needs to be modified, the slice data modification unit U110 changes the data of the region in which the lamination is difficult to data for adhesion.

For example, a region in which a layer of the second molding material that is different from the first molding material is to be laminated on a layer of the first molding material in the ith layer is extracted, and if that region includes a region having a size greater than the size that makes the lamination difficult, it is determined that the data needs to be modified. Then, in the region for which it has been determined that the data needs to be modified, the data of the (i+1)th layer is changed to the data for adhesion in which the second molding material and the first molding material of the same type as the ith layer are present in a mixed pattern (S513).

Here, although an example in which the data of the ith layer and the data of the (i+1)th layer are analyzed and the data of the (i+1)th material layer is modified is illustrated, this is not a limiting example. In addition to the (i+1)th layer, data of a material layer in an (i+2)th layer and thereafter to be laminated over the (i+1)th later may be changed to data for adhesion. In addition, data of a plurality of layers across the lamination (adhesion) surface may be analyzed, and data of a necessary region in these layers may be modified to form data for adhesion.

A region in which layers of molding materials of different types are to be laminated together can be extracted by numerically expressing the positional information and the material information of the data of the (i+1)th layer and of the ith layer and by obtaining the difference therebetween. For example, color information, such as cyan for the first structure material, magenta for the second structure material, and yellow for the support material, may be appended to the slice data and the difference between the numerical values of the color information at each position may be obtained. Alternatively, the first molding material may be represented numerically as "0," the second molding material may be represented numerically as "1," the third molding material may be represented numerically as "2," and the difference therebetween may be obtained.

In the present exemplary embodiment, a region in which layers of materials of different types are to be laminated together is extracted by analyzing the data of the layers that are in contact with each other and to be laminated together, and the data is modified to data for adhesion, but this is not a limiting example. For example, when slice data is generated from slice information of a three-dimensional model, a region with difficulty in lamination in which layers of molding materials of different types are to be laminated together may be extracted, and the data therefor may be modified in advance to slice data that includes data for adhesion. The modification to the data for adhesion may be carried out on at least one of the ith layer and the (i+1)th layer that are in contact with each other and to be laminated together or may be carried out on a plurality layers preceding the lamination surface or a plurality of layers to be laminated on the lamination surface.

The (i+1)th material layer that is to serve as an adhesive layer is formed in a similar manner to the ith material layer on the basis of the modified data (data for adhesion). The formed (i+1)th material layer is conveyed to the lamination unit U3 by the first conveyance belt 11 and is laminated on the lamination surface in a similar manner to the lamination process described above.

When the proportion of the first molding material present in a mixed pattern in the (i+1)th layer serving as the adhesive layer is too small with respect to the first molding material in the ith layer, a region in which the first and second molding materials are present in a mixed pattern cannot be laminated on a layer of the first molding material. In addition, when the proportion of the first molding material to be made present in a mixed pattern is too high, the second molding material cannot be bonded thereto, and the (i+1)th layer cannot be laminated on the ith layer.

Figure 8A:
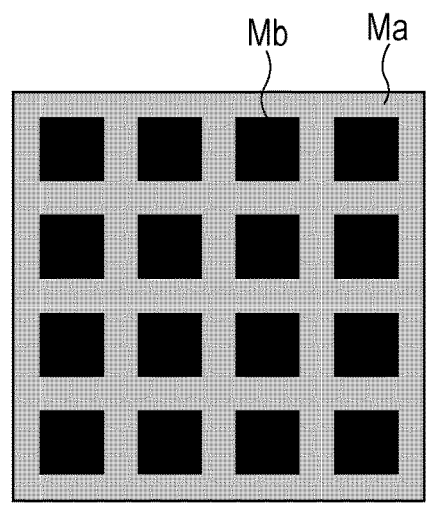
FIG. 8A illustrates a pattern example of a case in which two types of molding materials are disposed in a certain pattern to be present in a mixed pattern.
Figure 15:
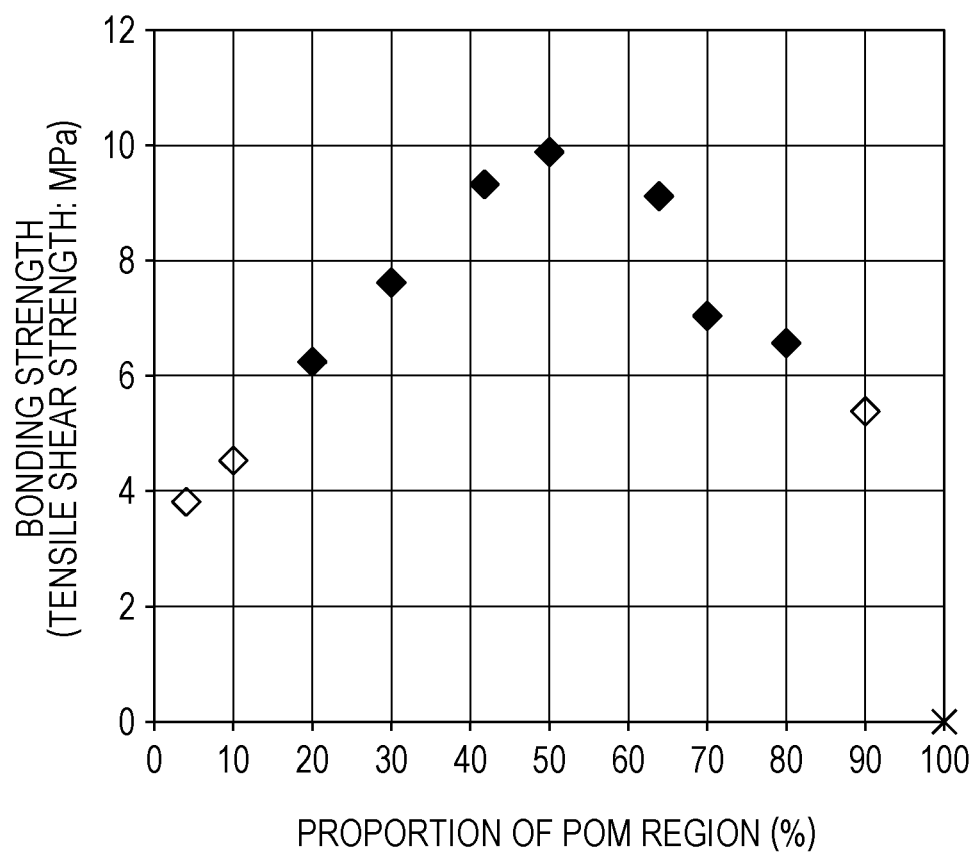
FIG. 15 is a graph illustrating a relationship between the proportions of two types of molding materials and the adhesive strength of an adhesive layer.

Therefore, the relationship between the ratio of S1 and S2 and the adhesive strength was measured, in which S1 represents the total area of a portion occupied by the first molding material and S2 represents the total area of a portion occupied by the second molding material in a region in which the first and second molding materials are present in a mixed pattern. Specifically, one of the two types of molding materials was disposed in a square pattern in which each square measures 1 mm on each side, as in the pattern illustrated in FIG. 8A. Then, the test piece illustrated in FIG. 12 was created with the relationship between S1 and S2 being varied by changing the pitch (density) of the pattern, and the tensile shear strength was measured in a similar manner to the one described above. Here, Ma in FIG. 8A is ABS resin, and Mb is POM resin. The result is illustrated in FIG. 15.

It is preferable that S1 and S2 satisfy the expression (1) in a region in which the first and second molding materials are present in a mixed pattern. When the first and second molding materials were present in a mixed pattern in a proportion that did not satisfy the expression (1) (solid-white dots in the graph), a lamination failure occurred, and the layers could not be laminated together when the two types of material were not present in a mixed pattern.

[Math. 1]

$$0.20 \leq \frac{S1}{(S1+S2)} \leq 0.80 \quad (1)$$

It is more preferable that S1 and S2 satisfy the expression (2).

[Math. 2]

$$0.42 \leq \frac{S1}{(S1+S2)} \leq 0.65 \quad (2)$$

In addition, the bonding strength is maximized when S1 and S2 satisfy the expression (3).

[Math. 3]

$$\frac{S1}{S1+S2} = 0.5 \quad (3)$$

Figure 8B:
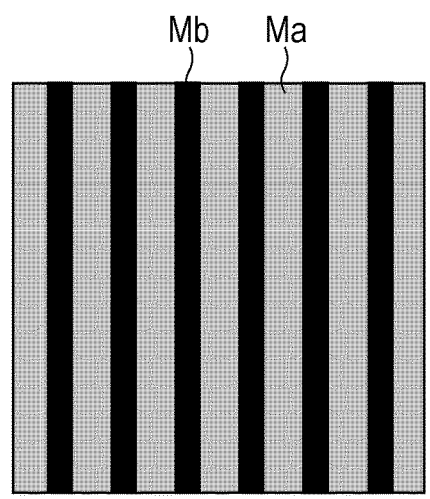
FIG. 8B illustrates a pattern example of a case in which two types of molding materials are disposed in a certain pattern to be present in a mixed pattern.
Figure 8C:
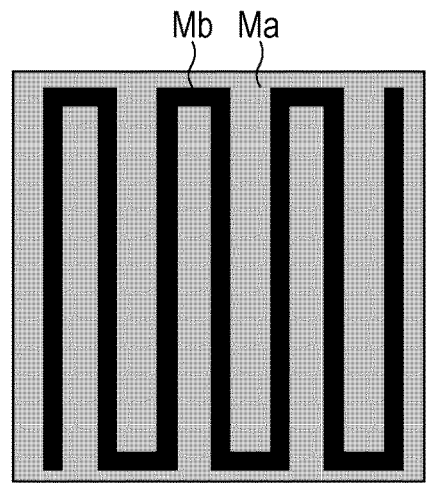
FIG. 8C illustrates a pattern example of a case in which two types of molding materials are disposed in a certain pattern to be present in a mixed pattern.

FIGS. 8A through 8C illustrate arrangement pattern examples when the two types of molding materials are made to be present in a mixed pattern. The pattern is not particularly limited, but in order to bond the layers uniformly, it is preferable that the two types of molding materials be dispersed finely, and it is particularly preferable that the two types of materials be disposed in an alternating manner at an interval of less than 2 mm in at least one direction.

After an adhesive layer is laminated, a process of forming an (i+2)th material layer to be laminated next is started (S501–). The data of the (i+2)th layer and the modified data of the (i+1)th layer are analyzed, and it is determined whether the lamination surfaces of the (i+1)th material layer and of the (i+2)th material layer include a region in which materials of different types are to be fused together. If there is a region in which materials of different types are to be fused together, it is determined whether the data needs to be modified, and processing similar to that in the case of laminating the (i+1)th layer described above is carried out.

Figure 9A:
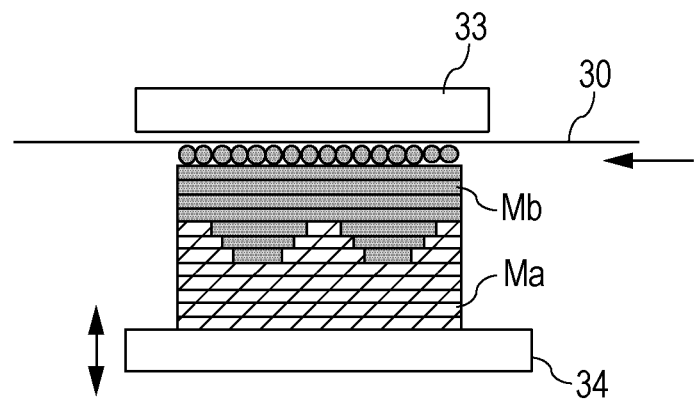
FIG. 9A illustrates an example in which layers made of two types of molding materials in different patterns are laminated together.

If there is no region in which materials of different types are to be fused together between the (i+1)th layer of which the data has been modified in order to provide an adhesive layer and the (i+2)th layer and in which bonding is difficult, the data of the (i+2)th layer does not need to be modified. However, when a plurality of adhesive layers are to be formed in order to enhance the bonding strength between the ith layer and the (i+1)th layer, as illustrated in FIGS. 9A and 9B, the data of the (i+2)th layer also needs to be modified to the data for adhesion.

When a plurality of adhesive layers are formed, it is preferable that materials be made to be present in a pattern different from that of the (i+1)th material layer in a region for which the data is modified in the adhesive layer in the (i+2)th layer. However, as illustrated in FIG. 9A or 9B, a region in which a plurality of layers of a material of the same type are laminated successively should be provided.

Figure 9B:
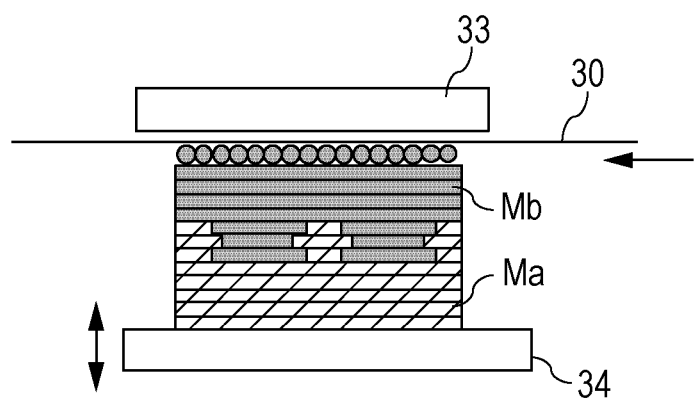
FIG. 9B illustrates an example in which layers made of two types of molding materials in different patterns are laminated together.

When a plurality of adhesive layers are formed, in particular, as illustrated in FIG. 9B, higher bonding strength can be obtained when materials of different types are provided in a dovetail manner along a section in the lamination direction of the adhesive layers, which is thus preferable. In this case, if the number of layers of the adhesive layers is set in advance, even in a case in which there is no region in which materials of different types are to be fused together in the lamination surfaces of the (i+1)th material layer and of the (i+2)th material layer, the data can be modified by referring to the data corresponding to the set number of layers.

By repeating the material layer forming process and the lamination process in a required number of times, a desired molded object is formed on the stage 34. Lastly, the molded object is removed from the stage 34, the water-soluble support portion is removed with a solvent containing water, such as hot water, and thus a three-dimensional object, which is a molding target, can be manufactured. After the support portion is removed, the three-dimensional object may be subjected, for example, to predetermined processing, such as cleaning, polishing, or assembling.

With the method and the apparatus for molding a three-dimensional object according to an exemplary embodiment of the present invention, if a region in which layers of materials of different types are to be laminated together is included between the ith layer and the (i+1)th layer that are in contact with each other and to be laminated together, it is analyzed whether the area of each region exceeds a predetermined area. Then, if there is a region whose area exceeds the predetermined area, the slice data modification unit U11 modifies the data such that an adhesive layer is formed in that region. Specifically, the data of the ith layer or the (i+1)th layer in the region in which bonding is difficult is modified to data for adhesion having a pattern in which a region in which layers of materials of the same type are laminated together and a region in which layers of materials of different types are laminated together are present in a mixed pattern. This makes it possible to laminate material layers that include a region in which bonding is difficult. Consequently, a molded object whose physical property varies partially in accordance with a requirement can be manufactured.

Second Exemplary Embodiment

A molding apparatus according to a second exemplary embodiment will be described. In the first exemplary embodiment, two types of molding materials are disposed in a mixed pattern in an adhesive layer. In the present exemplary embodiment, a molding material for adhesion in which two types of materials are mixed in advance is used. Hereinafter, descriptions that are common to the first exemplary embodiment will be omitted, and only the process unique to the second exemplary embodiment will be described.

The molding apparatus according to the present exemplary embodiment can also carry out the material layer forming process and the lamination process in accordance with the flowchart illustrated in FIG. 7.

When the material layer forming process of an (i+1)th layer is started, it is analyzed whether a region in which layers of materials of different types are to be laminated together is included on the basis of the data of the ith layer that has been laminated and the data of the (i+1)th layer. If it is determined that a region in which layers of materials of different types are to be laminated together is included and that the lamination in that region is difficult, it is determined that the data of the (i+1)th layer needs to be modified. Then, the data of the (i+1)th layer is modified such that a region made of a mixed material of the first molding material and the second molding material is laminated on a region made of the first molding material in the ith layer. In the present exemplary embodiment as well, the data may be modified such that at least one of the ith layer and the (i+1)th layer serves as an adhesive layer. In addition, a single adhesive layer may be provided, or a plurality of adhesive layers may be provided.

FIG. 10 is a schematic diagram illustrating an example of a material layer forming unit of a three-dimensional molding apparatus according to the second exemplary embodiment. Ma in FIG. 10 is the first molding material, Mb is the second molding material, and Ma+Mb is a mixed material of the first molding material and the second molding material (molding material for adhesion).

Ma+Mb can be used to form a region in which the first molding material and the second molding material are mixed. For example, Ma+Mb can be used to form an adhesive layer in a case in which a region formed by the second molding material in the (i+1)th layer is laminated on a region formed by the first molding material in the ith layer. In addition, Ma+Mb can be used to form an adhesive layer in a case in which a region formed by the first molding material in the (i+1)th layer is laminated on a region formed by the second molding material in the ith layer.

Figure 16:
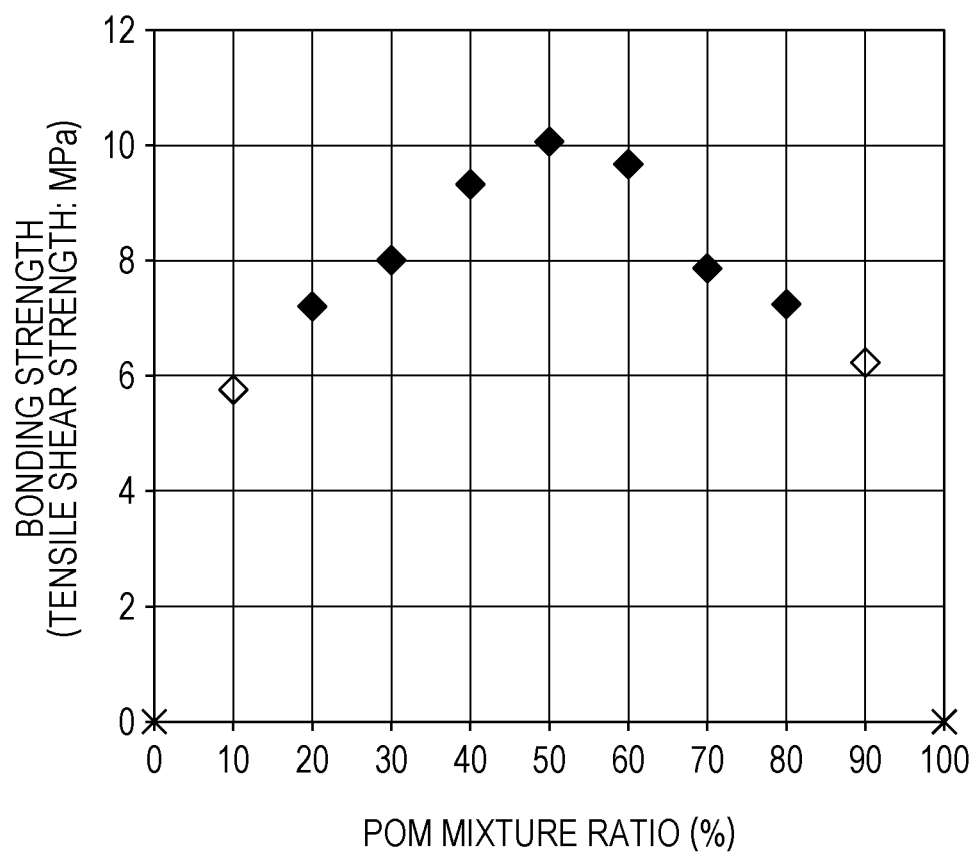
FIG. 16 is a graph illustrating a relationship between the mixture ratio of two types of molding materials and the adhesive strength of an adhesive layer.

Here, adhesive layers were formed with the use of a molding material for adhesion whose mixture ratio of powder of ABS resin serving as Ma and powder of POM resin serving as Mb is varied, test pieces similar to those of the first exemplary embodiment were molded, and the bonding strength was evaluated through the tensile shear test in a similar manner. The result is illustrated in FIG. 16. Similarly to the result illustrated in FIG. 15, the highest bonding strength was obtained when the proportion of the POM was 50%, and a lamination failure occurred when the mixture ratio of the POM was no more than 10% or no less than 90%. In other words, when the amount of the first molding material mixed in the molding material for adhesion is too small, the molding material for adhesion and the first molding material cannot be firmly bonded to each other, and thus lamination cannot be achieved. On the other hand, when the amount of the first molding material is too large, the molding material for adhesion and the second molding material cannot be firmly bonded to each other, and the lamination cannot be achieved.

Therefore, it is preferable that the following expression (4) be satisfied, in which V1 represents the total volume of the first molding material contained in the molding material for adhesion, and V2 represents the total volume of the second molding material.

[Math. 4]

$$0.20 \leq \frac{V1}{(V1+V2)} \leq 0.80 \tag{4}$$

It is more preferable that the following expression (5) be satisfied.

[Math. 5]

$$0.3 < \frac{V1}{V1+V2} < 0.7 \tag{5}$$

The most favorable adhesive strength can be obtained when the following expression (6) is satisfied.

[Math. 6]

$$\frac{V1}{V1+V2} = 0.5 \tag{6}$$

As described thus far, in the present exemplary embodiment as well, data of layers that are in contact with each other and to be laminated together is analyzed, and if there is a region in which layers of molding materials of different types are to be laminated together, at least one adhesive layer is formed. Specifically, data of a region in which lamination is difficult is modified to data for adhesion through which a molding material for adhesion in which the materials are mixed such that the molding material of the same type as the layer that has been laminated and the material of a different type from the stated layer are mixed. With this, layers of molding materials of different types can be laminated together. Consequently, a molded object whose physical property varies partially in accordance with a requirement can be manufactured.

Thus far, exemplary embodiments of the present invention have been described, but the present invention is not limited to these exemplary embodiments, and various modifications and changes can be made within the scope of the spirit of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-249088 filed Dec. 21, 2015 and No. 2016-237685 filed Dec. 7, 2016, which are hereby incorporated by reference herein in their entirety.

REFERENCE SIGNS LIST

U1 CONTROL UNIT
U2 MATERIAL LAYER FORMING UNIT
U3 LAMINATION UNIT
U11 SLICE DATA GENERATION UNIT
U110 SLICE DATA MODIFICATION UNIT
10, 10a, 10b, 10c, 10d MATERIAL IMAGE FORMING UNIT
11 FIRST CONVEYANCE BELT (FIRST CONVEYANCE MEMBER)

20 SECOND CONVEYANCE BELT (SECOND CONVEYANCE MEMBER)
33 HEATER
34 STAGE

The invention claimed is:

1. A data processing apparatus comprising:
a processor configured to process slice data that is generated from three-dimensional data of a model and that includes information about a type and arrangement of a molding material; and
a memory storing a program executed by the processor, wherein the processor performs processing including:
(1) analyzing data of an ith layer and data of an (i+1)th layer included in the slice data, where i is a positive integer, and extracting an area in which a layer of a second molding material that is different from a first molding material is to be laminated over the first molding material; and
(2) comparing an area of the area with a predetermined value, and modifying slice data of at least one of the ith layer and the (i+1)th layer in the area to data in which the first molding material and the second molding material are dispersed and arranged with an area smaller than the predetermined value in a case where the area of the area is greater than or equal to the predetermined value.

2. The data processing apparatus according to claim 1, wherein the processor modifies the slice data of at least one of the ith layer and the (i+1)th layer such that the resultant slice data indicates that the first molding material and the second molding material are disposed in a predetermined pattern.

3. The data processing apparatus according to claim 2, wherein the processor provides the predetermined pattern in which the first molding material and the second molding material are alternately disposed at an interval of less than 2 mm in at least one direction.

4. The data processing apparatus according to claim 1, wherein the processor modifies the slice data of the area of at least one of the ith layer and the (i+1)th layer such that the resultant slice data includes data of a mixed material including the first molding material and the second molding material.

5. A molding system for manufacturing a three-dimensional object, the system comprising:
the data processing apparatus according to claim 1;
a wherein a processor and a memory, included in the system, are configured to acquire data processed by the data processing apparatus, and to control laminating of a material.

6. A data processing method comprising:
acquiring slice data for molding a three-dimensional object, wherein the slice data includes information about a type and an arrangement of a molding material;
analyzing data of an ith layer and data of an (i+1)th layer included in the slice data, where i is a positive integer, and extracting an area in which a layer of a second molding material that is different from a first molding material is to be laminated over the first molding material; and
comparing an area of the area with a predetermined value, and modifying slice data of at least one of the ith layer and the (i+1)th layer in the area to data in which the first molding material and the second molding material are dispersed and arranged with an area smaller than the predetermined value in a case where the area of the area is greater than or equal to the predetermined value.

7. The data processing method according to claim 6, wherein, when modifying the slice data to obtain the resultant slice data in which the first molding material and the second molding material are present in a mixed manner, the slice data of the area of at least one of the ith layer and the (i+1)th layer is modified such that the resultant slice data indicates that the first molding material and the second molding material are disposed in a predetermined pattern.

8. The data processing method according to claim 7, wherein the predetermined pattern is a pattern in which the first molding material and the second molding material are alternately disposed at an interval of less than 2 mm in at least one direction.

9. The data processing method according to claim 8, wherein, when modifying the slice data to obtain the resultant slice data in which the first molding material and the second molding material are present in a mixed manner, the slice data of the area of at least one of the ith layer and the (i+1)th layer is modified such that the resultant slice data includes data of a mixed material including the first molding material and the second molding material.

10. A computer-readable storage medium storing a program for causing a computer to execute the data processing method according to claim 6.

11. A data processing apparatus comprising:
a processor configured to process slice data that is generated from three-dimensional data of a model and that includes information about a type and arrangement of a molding material; and
a memory storing a program executed by the processor, wherein the processor performs processing including:
(1) extracting an area in which a layer of a second molding material different from a first molding material is to be laminated over the first molding material from an ith layer and an (i+1)th layer included in the slice data, where i is a positive integer; and
(2) modifying data of at least one of the ith layer and the (i+1)th layer such that a portion where materials of a same type are laminated is included in the area.

12. The data processing apparatus according to claim 11, wherein the processor modifies the data of at least one of the ith layer and the (i+1)th layer such that the first molding material and the second molding material are arranged in a predetermined pattern in the area.

13. The data processing apparatus according to claim 11, wherein the processor modifies the data of at least one of the ith layer and the (i+1)th layer such that a mixed material including the first molding material and the second molding material is arranged in the area.

14. A molding system for manufacturing a three-dimensional object, the system comprising:
the data processing apparatus according to claim 11,
wherein a processor and a memory, included in the system, are configured to acquire data processed by the data processing apparatus, and to control laminating of a material.

15. A data processing method comprising:
acquiring slice data that is generated from three-dimensional data of a model and that includes information about a type and arrangement of a molding material;
extracting an area in which a layer of a second molding material different from a first molding material is to be laminated over the first molding material from an ith layer and an (i+1)th layer included in the slice data, where i is a positive integer; and modifying data of at least one of the ith layer and the (i+1)th layer such that a portion where materials of a same type are laminated is included in the area.

16. A computer-readable storage medium storing a program for causing a computer to execute the data processing method according to claim 15.

* * * * *